United States Patent
Katchapalayam et al.

(10) Patent No.: US 11,068,280 B2
(45) Date of Patent: *Jul. 20, 2021

(54) METHODS AND SYSTEMS FOR PERFORMING AN EARLY RETRIEVAL PROCESS DURING THE USER-MODE STARTUP OF AN OPERATING SYSTEM

(71) Applicant: HyTrust, Inc., Mountain View, CA (US)

(72) Inventors: Babu Katchapalayam, Cupertino, CA (US); Stephen D. Pate, Livermore, CA (US)

(73) Assignee: HyTrust, Inc., Mountain View, CA (US)

( * ) Notice: Subject to any disclaimer, the term of this patent is extended or adjusted under 35 U.S.C. 154(b) by 151 days.

This patent is subject to a terminal disclaimer.

(21) Appl. No.: 16/481,726

(22) PCT Filed: Sep. 21, 2017

(86) PCT No.: PCT/US2017/052777
§ 371 (c)(1),
(2) Date: Jul. 29, 2019

(87) PCT Pub. No.: WO2018/144072
PCT Pub. Date: Aug. 9, 2018

(65) Prior Publication Data
US 2019/0370013 A1 Dec. 5, 2019

Related U.S. Application Data

(63) Continuation of application No. PCT/US2017/052777, filed on Sep. 21, 2017, which
(Continued)

(51) Int. Cl.
*G06F 9/44* (2018.01)
*G06F 9/4401* (2018.01)
(Continued)

(52) U.S. Cl.
CPC .............. *G06F 9/4418* (2013.01); *G06F 9/44* (2013.01); *G06F 9/4406* (2013.01);
(Continued)

(58) Field of Classification Search
CPC ..... G06F 1/32; G06F 1/26; G06F 1/12; G06F 9/44; G06F 1/28
See application file for complete search history.

(56) References Cited

U.S. PATENT DOCUMENTS 7,376,968 B2  5/2008  Ritz et al.
7,694,121 B2  4/2010  Willman et al.
(Continued)

FOREIGN PATENT DOCUMENTS

EP    2797022 A1    10/2014

OTHER PUBLICATIONS

International Search Report and Written Opinion dated Nov. 20, 2017, from the IPEA/European Patent Office, for International Patent Application No. PCT/US2017/052777 (filed Sep. 21, 2017), 15 pages.

(Continued)

*Primary Examiner* — Keshab R Pandey
(74) *Attorney, Agent, or Firm* — Ascenda Law Group, PC

(57) ABSTRACT

During the user-mode startup of an operating system of a computing system and prior to the execution of a service control manager process, an early retrieval process is launched so as to retrieve (i) decryption keys corresponding to one or more encrypted files, folders or data partitions and/or (ii) an access control policy from a key management server external to the computing system. The retrieved information may be provided to a disk filter driver and/or file system filter driver of the operating system. In order to communicate with the external key management server, the early retrieval process may initialize the network stack of the (Continued)

computing system, since network services is not yet available prior to the execution of the services.exe process.

18 Claims, 13 Drawing Sheets

Related U.S. Application Data is a continuation-in-part of application No. 15/711,535, filed on Sep. 21, 2017, now Pat. No. 10,402,206, and a continuation-in-part of application No. 15/421,291, filed on Jan. 31, 2017, now Pat. No. 9,817,675, said application No. 15/711,535 is a continuation-in-part of application No. 15/421,291, filed on Jan. 31, 2017, now Pat. No. 9,817,675.

(51) Int. Cl.
| | |
|---|---|
| *H04L 9/08* | (2006.01) |
| *G06F 21/57* | (2013.01) |
| *G06F 21/62* | (2013.01) |
| *H04L 9/14* | (2006.01) |
| *G06F 1/32* | (2019.01) |

(52) U.S. Cl.
CPC .......... *G06F 9/4411* (2013.01); *G06F 21/575* (2013.01); *G06F 21/6209* (2013.01); *G06F 21/6218* (2013.01); *H04L 9/083* (2013.01); *H04L 9/0894* (2013.01); *H04L 9/14* (2013.01); *G06F 1/32* (2013.01)

(56) References Cited

U.S. PATENT DOCUMENTS

| | | | |
|---|---|---|---|
| 8,108,940 | B2 | 1/2012 | Dias et al. |
| 8,321,657 | B2 | 11/2012 | Pant et al. |
| 8,555,377 | B2 | 10/2013 | Pate |
| 8,687,814 | B2 | 4/2014 | Nord et al. |
| 9,866,553 | B2* | 1/2018 | Brassard ............ H04L 63/0869 |
| 2002/0116625 | A1 | 8/2002 | Sato |
| 2012/0110328 | A1 | 5/2012 | Pate et al. |
| 2012/0151199 | A1* | 6/2012 | Shriver ................ G06F 21/575 |
| | | | 713/2 |
| 2013/0173900 | A1 | 7/2013 | Liu |
| 2015/0052216 | A1 | 2/2015 | Matthews et al. |
| 2015/0294112 | A1 | 10/2015 | Pintiysky et al. |
| 2016/0191481 | A1 | 6/2016 | Zimmer et al. |
| 2016/0196424 | A1 | 7/2016 | Chapman, III |
| 2016/0267275 | A1 | 9/2016 | Gschwind |
| 2016/0269364 | A1 | 9/2016 | White et al. |
| 2016/0283404 | A1* | 9/2016 | Xing .................... G06F 9/4406 |
| 2018/0204007 | A1* | 7/2018 | Rangayyan ........... G06F 9/4406 |

OTHER PUBLICATIONS

International Preliminary Report on Patentability dated Jan. 15, 2019, from the ISA/US, for International Patent Application No. PCT/US2017/052777 (filed Sep. 21, 2017), 21 pages.
Response to Written Opinion filed Jan. 22, 2018, for International Patent Application No. PCT/US2017/052777 (filed Sep. 21, 2017), 15 pages.
Notice of Allowance dated May 14, 2019, for U.S. Appl. No. 15/711,535, filed Sep. 21, 2017, 5 pages.
Amendment filed Apr. 17, 2019, for U.S. Appl. No. 15/711,535, filed Sep. 21, 2017, 10 pages.
Non-Final Office Action dated Jan. 24, 2019, for U.S. Appl. No. 15/711,535, filed Sep. 21, 2017, 23 pages.
Amendment after Notice of Allowance filed Aug. 25, 2017, for U.S. Appl. No. 15/421,291, filed Jan. 31, 2017, 7 pages.
Notice of Allowance dated Jul. 12, 2017, for U.S. Appl. No. 15/421,291, filed Jan. 31, 2017, 6 pages.
Advisory Action dated Jun. 20, 2017, for U.S. Appl. No. 15/421,291, filed Jan. 31, 2017, 2 pages.
Amendment filed Jun. 6, 2017, for U.S. Appl. No. 15/421,291, filed Jan. 31, 2017, 7 pages.
Final Office Action dated May 26, 2017, for U.S. Appl. No. 15/421,291, filed Jan. 31, 2017, 17 pages.
Amendment filed Apr. 17, 2017, for U.S. Appl. No. 15/421,291, filed Jan. 31, 2017, 9 pages.
Non-Final Office Action dated Apr. 7, 2017, for U.S. Appl. No. 15/421,291, filed Jan. 31, 2017, 15 pages.

\* cited by examiner

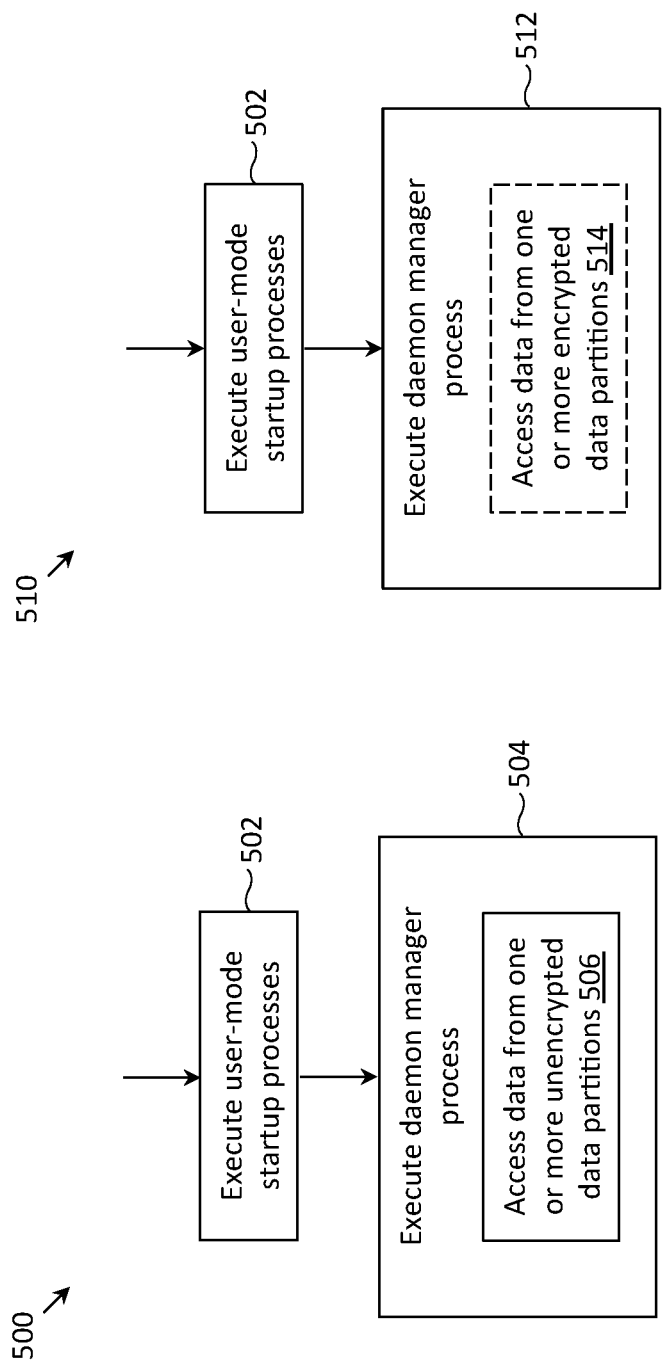

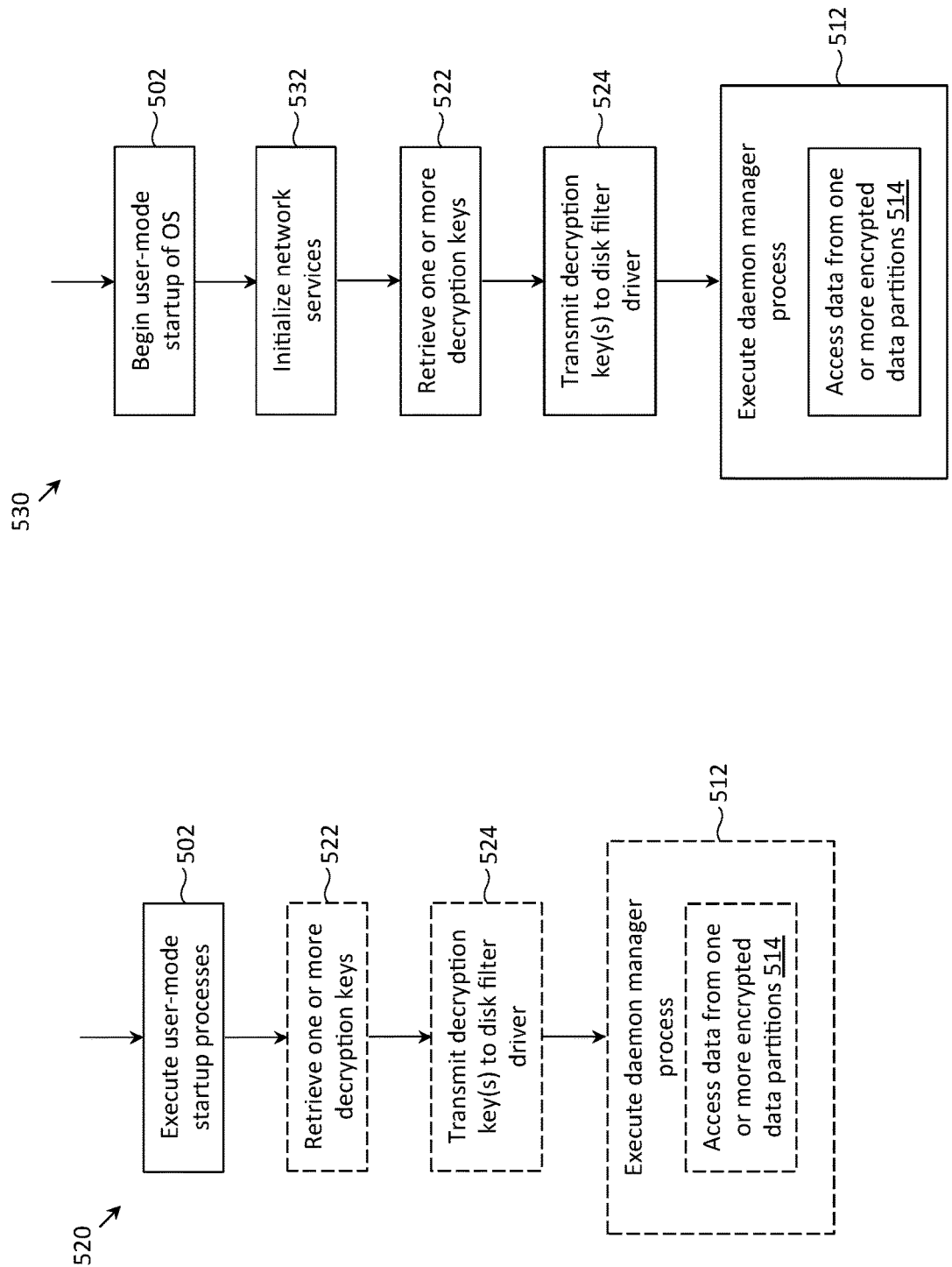

METHODS AND SYSTEMS FOR PERFORMING AN EARLY RETRIEVAL PROCESS DURING THE USER-MODE STARTUP OF AN OPERATING SYSTEM

RELATED APPLICATIONS

This application is a 371 National Stage of International Application No. PCT/US2017/052777 filed Sep. 21, 2017, which is (a) a CONTINUATION-IN-PART of U.S. patent application Ser. No. 15/421,291 filed Jan. 31, 2017, now issued as U.S. Pat. No. 9,817,675, and (b) a CONTINUATION-IN-PART of U.S. patent application Ser. No. 15/711,535 filed Sep. 21, 2017, now issued as U.S. Pat. No. 10,402,206, which is a CONTINUATION of U.S. patent application Ser. No. 15/421,291 filed Jan. 31, 2017, now issued as U.S. Pat. No. 9,817,675.

FIELD OF THE INVENTION

The present invention relates to the startup process of an operating system (i.e., a boot process), and more particularly relates to an early retrieval process that retrieves one or more decryption keys so as to allow the startup process to access one or more encrypted files, folders and data partitions. In addition or in the alternative, the early retrieval process may retrieve an access control policy which restricts access of one or more files, folders and data partitions to only authorized users and applications, and further may regulate the retrieval or use of the decryption keys.

BACKGROUND

An increasing amount of sensitive data (e.g., personal information, financial data, medical information, etc.) is being stored on computing systems. At the same time, the attempts by hackers and other malicious individuals to compromise or steal such sensitive data have become increasingly sophisticated and frequent. In one method to combat such attempts, data may be stored in an encrypted manner, such that even if a hacker were to gain access to a computing system, the data will appear in a form that is incomprehensible to the hacker.

Data encryption, however, poses certain challenges during the startup of an operating system. Such challenges as well as solutions to address these challenges are described hereinbelow.

SUMMARY OF THE INVENTION

Typically, during the startup of an operating system, certain applications/services of the operating system will access data from one or more files, folders and data partitions of the computing system and/or access an access control policy which controls access to the data. If the data is encrypted, such applications/services will still attempt to access the data, and upon an unsuccessful data access (assuming the one or more decryption keys is not available), the startup process will fail. If the startup requires access to the access control policy, and the access control policy is not accessible, data access may be granted to unauthorized users and applications. One way to address this problem is to detect the earliest time during the startup process that the operating system will access the one or more encrypted files, folders or data partitions and/or access control policy, and retrieve the one or more decryption keys (corresponding to the one or more encrypted files, folders or data partitions) and/or access control policy prior to such time. An additional complication is that the one or more decryption keys and the access control policy may be stored on an external key management server, so the retrieval of the decryption key(s) and/or access control policy may require network services of the operating system. Unfortunately, in the typical startup process, network services may not be initialized until after the applications/services have already attempted to access data from the one or more encrypted data partitions, and hence may not be initialized until after the startup process has already failed.

In accordance with one embodiment of the invention, a monitoring process is employed to monitor the execution of various user-mode processes (e.g., a master session manager (master smss.exe) process, a session manager (smss.exe) process, a client/server runtime subsystem (csrss.exe) process and a windows initialization (wininit.exe) process).

In one embodiment, immediately after the beginning of the execution of the master smss.exe process, the operating system startup process is paused, and an early retrieval process is launched so as to retrieve the one or more decryption keys and/or access control policy. In another embodiment, immediately after the beginning or conclusion of the execution of the smss.exe process, the operating system startup process is paused, and the early retrieval process is launched so as to retrieve the one or more decryption keys and/or access control policy. In another embodiment, immediately after the beginning or conclusion of the execution of the csrss.exe process, the operating system startup process is paused, and the early retrieval process is launched so as to retrieve the one or more decryption keys and/or access control policy. In another embodiment, immediately after the beginning or conclusion of the execution of the wininit.exe process, the operating system startup process is paused, and the early retrieval process is launched so as to retrieve the one or more decryption keys and/or access control policy. More generally, the early retrieval process may be launched at any time between the beginning of the execution of the master smss.exe process and the beginning of the execution of the services.exe process. More generally, the early retrieval process may be launched at any time during a user-mode startup of the operating system (the user-mode startup beginning with the execution of the master smss.exe process), but prior to the execution of the services.exe process.

As part of the early retrieval process, a dynamic Internet protocol (IP) address of the computing system may be retrieved from a dynamic host configuration protocol (DHCP) server. In an alternative embodiment, the early retrieval process may determine a static IP address of the computing system from the operating system. In either case, the IP address may be used by the early retrieval process to initialize the transmission control protocol (TCP)/IP network stack of the computing system. If the IP address of the key management server is not available at the computing system, the early retrieval process may contact a domain name system (DNS) server to convert a domain name of the key management server into an IP address. Having initialized the network stack and determined the IP address of the key management server, the early retrieval process may communicate with the key management server (e.g., via the Hypertext Transfer Protocol Secure (HTTPS) protocol) to retrieve one or more decryption keys that are needed to decrypt the one or more encrypted files, folders or data partitions and/or to retrieve the access control policy.

Upon retrieving the one or more decryption keys, the early retrieval process may transmit the one or more decryption keys to a disk filter driver (or file system filter driver) of the operating system, which makes the one or more encrypted data partitions (or encrypted files/folders) accessible to the operating system, including the daemon manager process and various application services of the operating system. Upon retrieving the access control policy, the early retrieval process may transmit the access control policy to the file system filter driver. When data from the one or more encrypted files, folders or data partitions is requested by applications/services of the operating system, the requested data will be retrieved from the one or more encrypted files, folders or data partitions in an encrypted form, decrypted by the disk filter driver (or file system filter driver) using the one or more decryption keys (subject to the access control policy), and returned to the applications/services. If not already apparent, the data in the one or more encrypted files, folders or data partitions remains encrypted at all times. With the one or more encrypted files, folders or data partitions accessible to the operating system, the startup process may complete successfully.

These and other embodiments of the invention are more fully described in association with the drawings below.

BRIEF DESCRIPTION OF THE DRAWINGS

FIG. 5A depicts a flowchart that provides a high level overview of the startup of an operating system using one or more unencrypted data partitions.

FIG. 5B depicts a flowchart that provides a high level overview of the startup of an operating system using one or more encrypted data partitions, in which the startup process fails due to the lack of access to the one or more decryption keys.

FIG. 5C depicts a flowchart that provides a high level overview of the startup of an operating system using one or more encrypted data partitions, in which challenges in the retrieval of the one or more decryption keys are described.

FIG. 5D depicts a flowchart that provides a high level overview of the startup of an operating system using one or more encrypted data partitions, in accordance with one embodiment of the invention.

DETAILED DESCRIPTION OF THE INVENTION

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention. Descriptions associated with any one of the figures may be applied to different figures containing like or similar components/steps. While the sequence diagrams each present a series of steps in a certain order, the order of some of the steps may be changed.

Figure 1:
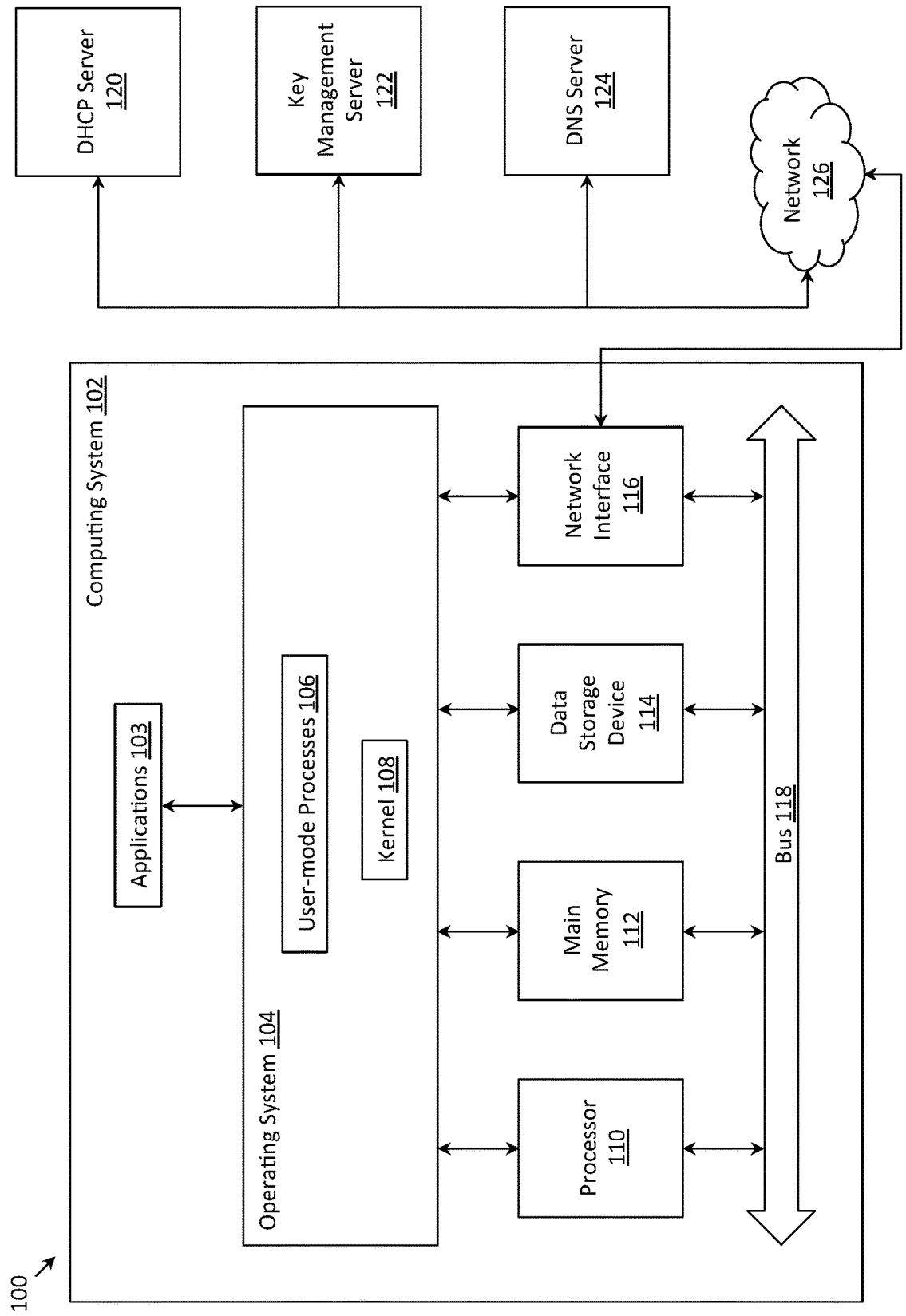
FIG. 1 depicts a computing system communicatively coupled to certain network components, in accordance with one embodiment of the invention.

FIG. 1 depicts system 100 that includes computing system 102 communicatively coupled to dynamic host configuration protocol (DHCP) server 120, key management server 122 and domain name system (DNS) server 124 via network 126. Computing system 102 may comprise certain hardware components (e.g., processor 110, main memory 112, data storage device 114, network interface 116, bus 118, etc.) and software components (e.g., application 103 and operating system 104). As is known in the art, instructions may be loaded from data storage device 114 into main memory 112, and be subsequently executed by processor 110 to perform the desired function of the instructions. These functions may be "higher-level" functions (e.g., playing a movie, sending an email, saving a file, opening a document, loading a webpage, etc.), or "lower-level" functions (e.g., transmitting an image to a display, receiving a mouse click, transmitting a read request to data storage device 114, transmitting a request to network interface 116 to communicate with a server, launching an application, etc.). Typically, the higher-level functions are performed by one or more software applications 103 (or "applications"), while the lower-level functions are performed by operating system 104. Stated differently, operating system 104 may act as an intermediary between software applications 103 and the hardware components of the computer system (e.g., processor 110, main memory 112, data storage device 114 and network interface 116), abstracting the low-level functionality of the hardware components from software applications 103. If there are several applications executing at the same time, operating system 104 may additionally manage the applications' use of the hardware components in a way that allows the hardware resources to be shared without contentions (e.g., without one application overwriting the data of another application).

Examples of an operating system are the Windows®, operating system developed by Microsoft Corporation® of Redmond, Wash.; the Linux® operating system developed by the open source community; OS/X® developed by Apple, Inc. of Cupertino, Calif.; Ubuntu® developed by Canonical Ltd.® of London, UK; etc. Examples of software applications include MS Word®, MS Excel®, MS Outlook® and MS PowerPoint® developed by Microsoft, Corp; the Mozilla Firefox® web browser developed by The Mozilla Foundation®; the Safari® web browser developed by Apple, Inc.; etc.

A central computer program of operating system 104 is known as kernel 108. Typically, kernel 108 is the first program of operating system 104 that is executed at the startup of the operating system. Kernel 108 may manage the startup process, including user-mode processes 106. As is known in the art, kernel 108 executes in the "kernel space" of the virtual memory (i.e., memory of main memory 112 which is addressed using virtual addresses), while user-mode processes 106 execute in the "user space" of the virtual memory. Such separation between the "kernel space" and "user space" prevents user-mode processes 106 from disrupting the operation of kernel 108, and prevents kernel 108 from disrupting the operation of user-mode processes 106.

While a single processor 110 is depicted in FIG. 1, it is understood that one or more processors may be employed in practice. Processor 110 may include a central processing unit (CPU), a digital signal processor (DSP), a microcontroller, etc. Data storage device 114 may comprise one or more hard drives (e.g., magnetic based storage), solid state drives (SSDs), optical drives, storage arrays, network attached storage arrays, etc. Network interface 116 may comprise any interface (e.g., an Ethernet card, a wireless transceiver) that communicatively couples computing system 102 to network 126. The functionality of DHCP server 120 and DNS server 124 will be explained in connection with FIG. 7 below and the functionality of key management server 122 will be explained in connection with FIGS. 2 and 7 below. Network 126 may be any form of wireless and/or wired communications means and, in some cases, may be individual communications links, or one or more communications networks, including private networks, public networks and/or virtual private networks over public networks.

Figure 2:
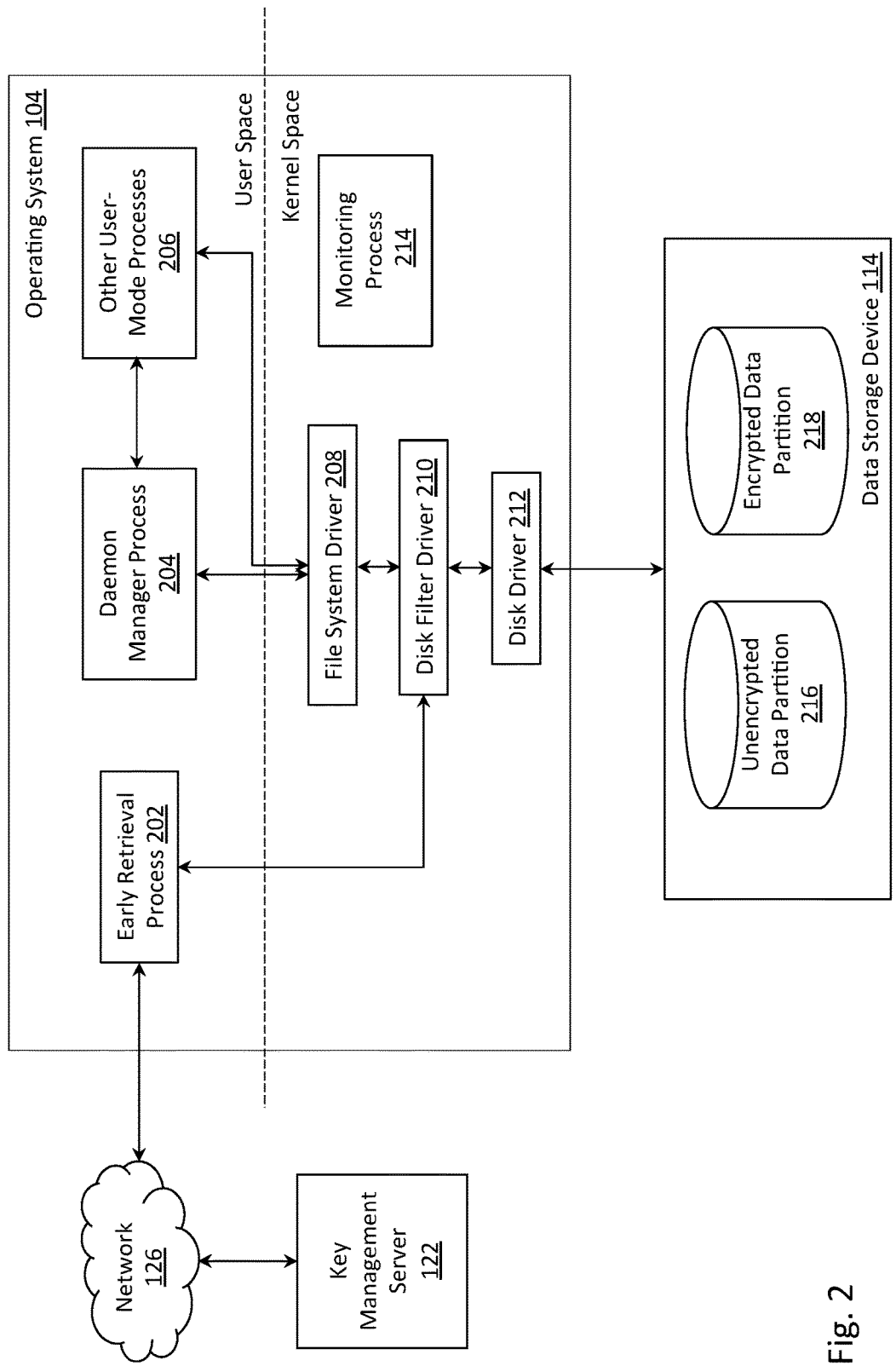
FIG. 2 depicts a computing system in which an early retrieval process is configured to retrieve one or more decryption keys from a key management server and provide such keys to a disk filter driver, in accordance with one embodiment of the invention.

FIG. 2 depicts system 100 with additional details of computing system 102 (e.g., additional details of operating system 104 and data storage device 114), in accordance with one embodiment of the invention. FIG. 2 is an abstracted version of the system illustrated in FIG. 1, and certain elements of computing system 102 have been omitted (e.g., processor, main memory, network interface) for conciseness of presentation. A disk device stack (including file system driver 208, disk filter driver 210 and disk driver 212) may be instantiated in the kernel space of operating system 104, and allows processes (e.g., daemon manager process 204) of operating system 104 to access data storage device 114 (i.e., in the context of FIG. 2, data storage device 114 is assumed to be a disk drive). While the embodiment of FIG. 2 is explained using a "disk device stack", it is understood that such concepts may more generally apply to a "storage device stack".

File system driver 208 may receive requests (i.e., read requests, write requests, etc.) for files or folders from user-mode processes, and the file system driver 208 may translate such requests into requests for the data blocks (or "blocks") that make up the files or folders. In a more basic embodiment (not depicted), file system driver 208 would pass such block requests directly to disk driver 212, and disk driver 212 would, in response to such block requests, either read a block from data storage device 114 or write to a block in data storage device 114. An example of file system driver 208 is the new technology file system (NTFS) for the Windows NT operating system. Disk drivers may be part of a standard operating system (e.g., Windows, OS/X, etc.).

In the example of FIG. 2, disk filter driver 210 is instantiated between file system driver 208 and disk driver 212, and such component may be responsible for the encryption and/or decryption of data. If data is to be stored in encrypted data partition 218, disk filter driver 210 may intercept a write request from file system driver 208 and encrypt the data blocks of the write request, before transmitting the encrypted data blocks to disk driver 212. If encrypted data is read from encrypted data partition 218, disk filter driver 210 may intercept encrypted data blocks from disk driver 212, decrypt the data blocks, before transmitting the decrypted data blocks to file system driver 208. If data is to be written to (or read from) unencrypted data partition 216, such data may pass through disk filter driver 210 without any processing. An example of a disk filter driver is "hcwin.sys" developed by HyTrust, Inc.® of Mountain View, Calif.

While a single unencrypted data partition 216 and a single encrypted data partition 218 is depicted in FIG. 2, it is understood that unencrypted data partition 216 may represent one or more unencrypted data partitions, and encrypted data partition 218 may represent one or more encrypted data partitions. If not already apparent, a data partition (whether encrypted or unencrypted) is a logical partition of the storage resources on data storage device 114. Typically, one or more data partitions are created on data storage device 114 before the creation of files or directories. During the creation of the one or more data partitions, information such as the location and size of a data partition may be stored on a partition table of data storage device 114. Data partitions allow different logical regions of data storage device 114 to be separately managed by operating system 104.

As part of the encryption or decryption process, disk filter driver 210 may employ a cryptographic key (or "key"), which may be symmetric or asymmetric. In the case of a symmetric key, the same key is used to both encrypt and decrypt data, while in the case of an asymmetric key, a first key is used to encrypt data, while a second key (different from the first key) is used to decrypt the data. In a preferred embodiment, a symmetric key is used by disk filter driver 210 to both encrypt and decrypt data. Keys (whether symmetric or asymmetric) may be stored at key management server 122. Typically, a process is employed to authenticate and authorize a user or a machine before access to a key is granted. Early retrieval process 202 is a user-mode process which may be used retrieve a key from key management server 122 via network 126 and provide such key to disk filter driver 210. Early retrieval process 202 is described in detail below in connection with FIGS. 6-8, 9A and 9B.

Daemon manager process 204 may be a user-mode process that manages all the application services of operating system 104. More specifically, daemon manager process 204 may initialize the network stack (i.e., driver stack for network interface 116) to allow computing system 102 to access network resources. In the Windows operating system, the service control manager (services.exe) may be an example of daemon manager process 204. Other examples of daemon manager process 204 include the init process for Linux/UNIX, the init process for Ubuntu, etc.

Other user-mode processes 206 may include a session manager (master smss.exe), session specific smss instances (smss.exe session 0, smss.exe session 1), client/server run-time subsystem (csrss.exe), Windows initialization process (wininit.exe), local security authority subsystem (lsass), and Windows logon process (winlogon.exe). Such user-mode processes will be described further in connection with FIG.

4 below. While Windows-based user-mode processes have been described, it is understood that non-Windows user-mode processes could be used instead. Further, a monitoring process 214 may be instantiated in the kernel space to monitor user-mode processes during the startup of operating system 104. Monitoring process 214 may be implemented using the Windows Kernel Mode driver.

Figure 3:
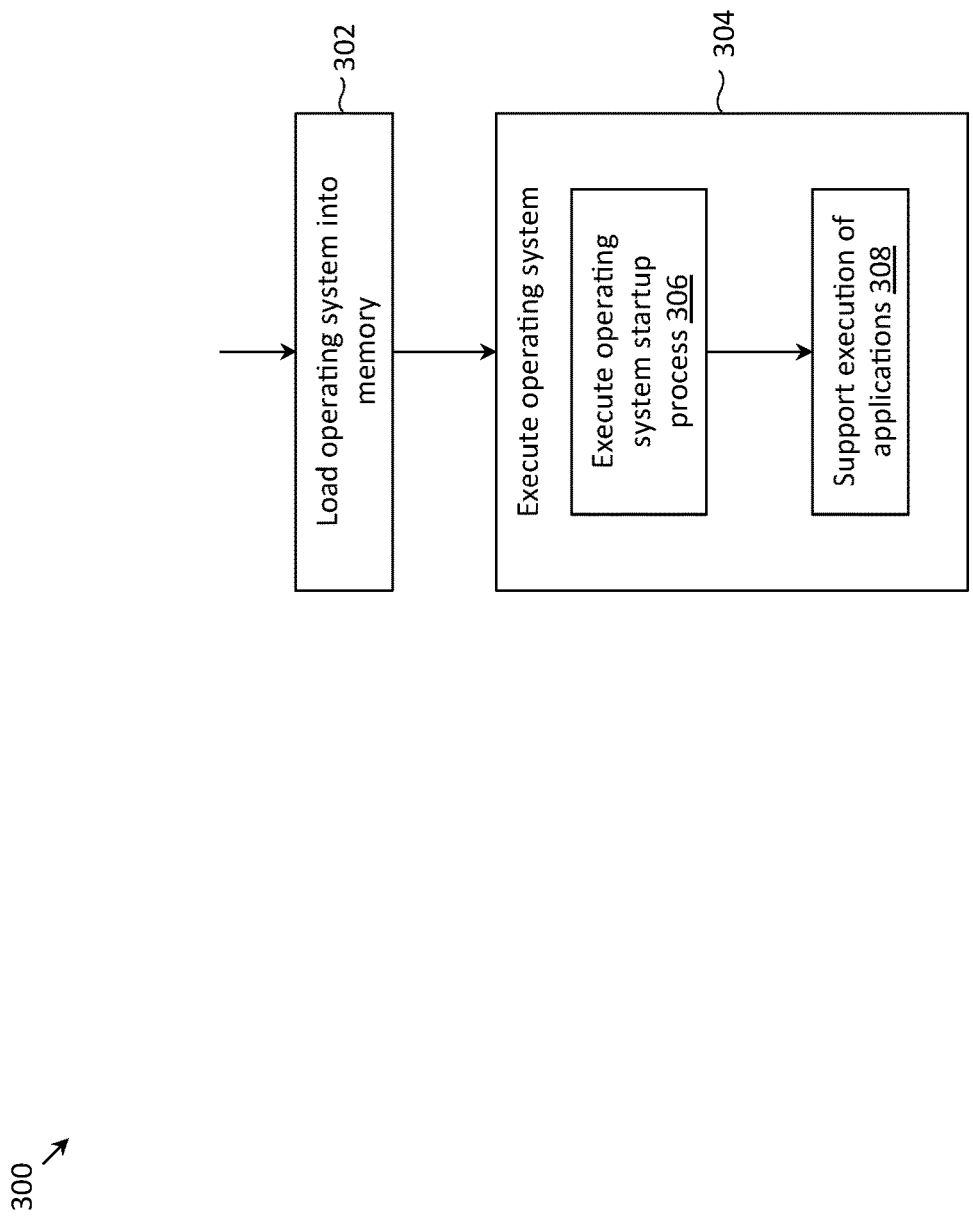
FIG. 3 depicts a flowchart that provides a high level overview of the operation of an operating system.

FIG. 3 depicts flow diagram 300 that provides a high level overview of the operation of operating system 104. At step 302, an operating system (i.e., the code which encodes for the operating system) may be loaded by a boot loader from a boot partition (e.g., located in unencrypted data partition 216) into main memory 112. Alternatively, the boot partition may be located in encrypted data partition 218, but then the boot partition would need to be decrypted before being loaded into main memory 112. One possible method for performing the decryption of the boot partition is described in US 2013/0173900 to Liu.

The portion of the operating system that is loaded into main memory 112 may comprise kernel 108 of the operating system. At step 304, operating system 104 may be executed. The execution of operating system 104 may begin with the execution of a startup process (step 306). In the first step of the startup process, kernel 108 may be executed. The execution of kernel 108 may be followed by the execution of various kernel-mode processes (e.g., device drivers such as network storage, file system, display, etc.) and user-mode processes (e.g., smss.exe, csrss.exe, wininit.exe, services.exe, lsass.exe, winlogon.exe, etc.). After the startup process has concluded (i.e., conclusion of the booting process), operating system 104 may support the execution of applications (step 308), as part of its normal operation.

Figure 4:
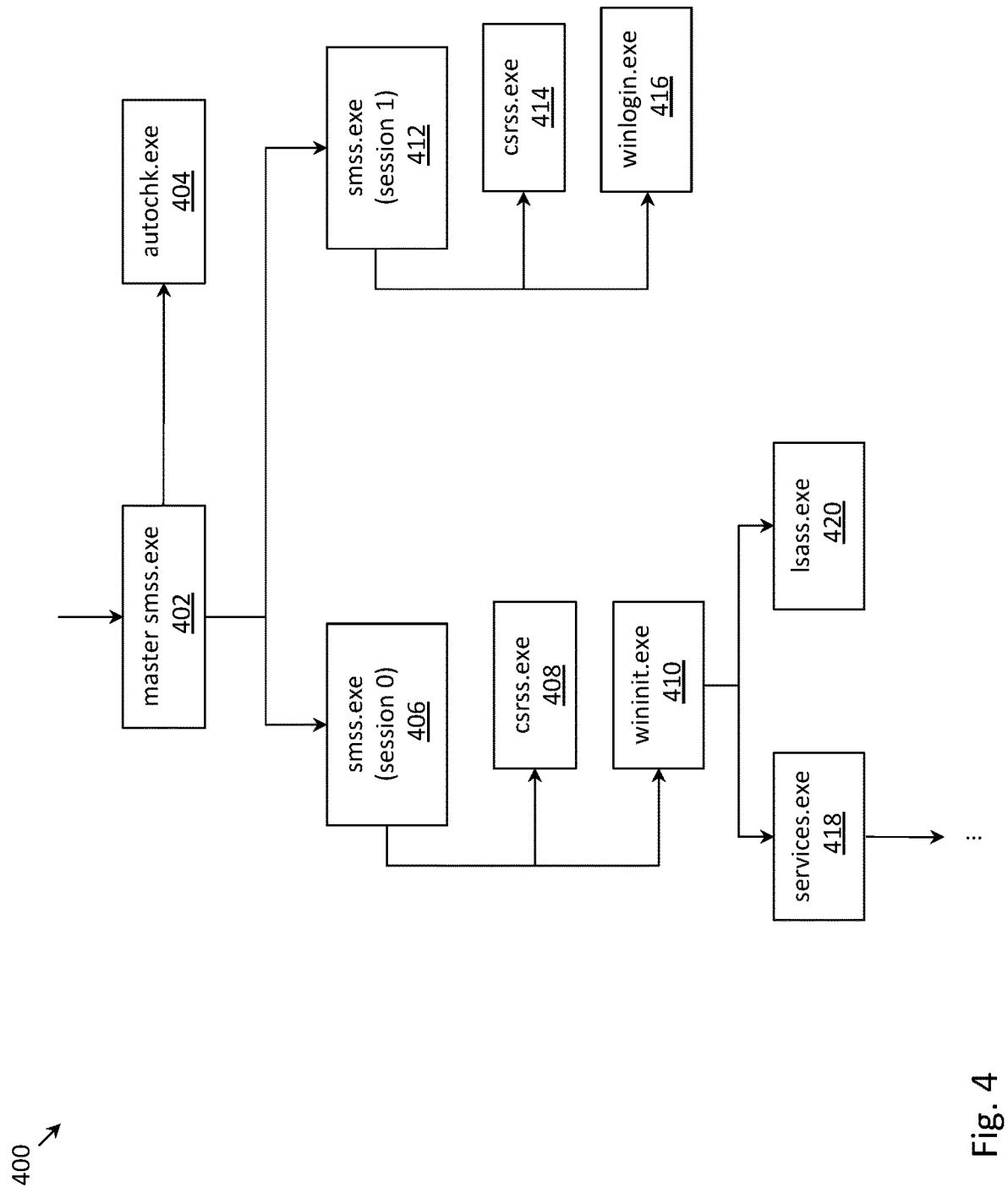
FIG. 4 depicts a flowchart of an execution flow of user-mode processes during the user mode startup of the Microsoft Windows® operating system.

FIG. 4 depicts flowchart 400 of an execution flow of user-mode processes during the user-mode startup of the Windows operating system. In the first step of the flow (step 402), a master session manager (manager smss) process may be created, and may remain running until the shutdown of the operating system. Following the creation of the master smss process, an autochk process 404, which provides facilities for restoring core system settings, may be executed. The master smss may create session specific smss processes (steps 406 and 412), which may terminate once the session initialization has been completed. A session is an object name-space consisting of processes, Windows desktops, Windows, etc., and is created when an interactive logon takes place either locally or remotely using the remote desktop protocol (RDP). Session 0, a special non-interactive session, is created to host key Windows system processes and services, and application services. Session 1 and sessions greater than 1 are created to facilitate interactive logon either locally or remotely.

Following the creation of smss.exe (session 1), an additional client/server runtime subsystem process (csrss.exe) may be executed (step 414). Further, a windows login process (winlogin.exe) may be executed (step 416) which handles the login and logoff of a user.

Following the creation of smss.exe (session 0), a client/server runtime subsystem process (csrss.exe) may be executed (step 408), which may be responsible for handling Win32 console windows, process/thread creation, side-by-side support, logoff/system shutdown. Further, a windows initialization process (wininit.exe) may be executed (step 410), which may be responsible for initializing session 0 and starting certain key file system processes. Following the execution of wininit.exe, a service control manager process (services.exe) may be executed (step 418) to start and manage Windows Services (i.e., daemon processes), and a local security authority subsystem server process (lsass.exe) may be executed (step 420) to enforce local security policy, user authentication, etc. lsass.exe may also host several security related services such as the Active Directory Service. Following the execution of services.exe, other user-mode processes may be executed (not depicted).

FIG. 5A depicts flowchart 500 that provides a high level overview of the startup of operating system 104 using one or more unencrypted data partitions 216. At step 502, various user-mode startup processes may be executed (e.g., master smss.exe, autochk.exe, smss.exe (session 0), csrss.exe, wininit.exe, smss.exe (session 1), csrss.exe and winlogin.exe). After the execution of wininit.exe, daemon manager process 204 may be executed (step 504). The execution of services.exe is one example of the execution of daemon manager process 204, which initializes various application services and operating system services including network services. Further, daemon manager process 204 and various services started by daemon manger process 204 may access data from one or more unencrypted data partitions (step 506).

FIG. 5B depicts flowchart 510 that provides a high level overview of the startup of operating system 104 using one or more encrypted data partitions 218, in which the startup process fails due to the lack of access to the one or more decryption keys. FIG. 5B is similar to FIG. 5A, except that the data accessed by daemon manager process 204 and various application and operating system services started by the daemon manager process is stored on one or more encrypted data partitions 218 instead of one or more unencrypted data partitions 216. When daemon manager process 204 and/or the various application and operating system services started by the daemon manager process attempt to access data from the one or more encrypted data partitions (step 512), the data access will fail, because disk filter driver 210 will not yet have access to the one or more decryption keys needed to decrypt the one or more encrypted data partitions. Step 514 is depicted in dashed line to indicate that the execution of such step will result in failure.

FIG. 5C depicts flowchart 520 that provides a high level overview of the startup of operating system 104 using one or more encrypted data partitions 218, in which challenges in the retrieval of the one or more decryption keys are described. The process of FIG. 5C attempts to resolve the deficiency of FIG. 5B by retrieving the one or more decryption keys corresponding to the one or more encrypted data partitions (step 522) and transmitting the one or more decryption keys to disk filter driver 210 (step 524) prior to the execution of the daemon manager process 512. Such process likewise fails, because the retrieval of the one or more decryption keys requires prior initialization of the network services (since key management server 122 is communicatively coupled to computing system 102 via network 126). However, the initialization of the network services is a function that is typically performed by the daemon manger process in step 512, which occurs after step 522. Since the network services have not been initialized, retrieval of the one or more decryption keys is not possible in step 522, leading to the failure of the process. Steps 512, 514, 522 and 524 are depicted in dashed line to indicate that either the execution of such steps will result in failure or the process will fail before such steps can be performed.

FIG. 5D depicts flowchart 530 that provides a high level overview of the startup of operating system 104 using one or more encrypted data partitions 218, in accordance with one embodiment of the present invention. The process of FIG. 5D resolves the deficiency of FIG. 5C by initializing the network services (step 532) prior to the step of retrieving the one or more decryption keys (step 522). As noted above, daemon manager process 204 cannot be used to initialize the network services because it will not yet have executed before the retrieval of the one or more decryption keys is attempted. Instead, a process other than the daemon manager process 204 (i.e., early retrieval process 202) is used to initialize the network services.

Startup process 530 is now described in more detail. At step 502, the user-mode startup of an operating system may begin (e.g., the process depicted in FIG. 4). The user-mode startup may include the execution of various user-mode start-up processes, such as master smss.exe, autochk.exe, smss.exe (session 0), csrss.exe, wininit.exe, smss.exe (session 1) and csrss.exe. Any time during the user-mode startup and prior to the execution of the daemon manager process (e.g., services.exe), an early retrieval process 202 may be employed to initialize the network services (step 532) and retrieve the one or more decryption keys corresponding to the one or more encrypted data partitions from key management server (step 522).

In one embodiment of the invention, the execution of the early retrieval process may start at any time during or after the execution of the master session manager (master smss.exe) process and prior to the execution of the services.exe process. In another embodiment of the invention, the execution of the early retrieval process may start immediately after the beginning of the execution of the master session manager (master smss.exe) process. In another embodiment of the invention, the execution of the early retrieval process may start immediately after the beginning or conclusion of the execution of a session manager (smss.exe) process. In another embodiment of the invention, the execution of the early retrieval process may start immediately after the beginning or conclusion of the execution of a client/server runtime subsystem (csrss.exe) process. In another embodiment of the invention, the execution of the early retrieval process may start immediately after the beginning or conclusion of the execution of a windows initialization (wininit.exe) process.

The one or more decryption keys may then be provided to disk filter driver 210 (step 524). Finally, daemon manager process may be executed at step 512 without any errors. In particular, daemon manager process 204 and various services started by daemon manager process 204 will be able to access data from the one or more encrypted data partitions (step 514). When data from the one or more encrypted data partitions is requested by applications/services of the operating system, the requested data will be retrieved from the one or more encrypted data partitions in an encrypted form, decrypted by disk filter driver 210 using the one or more decryption keys, and returned to the applications/services.

Figure 6:
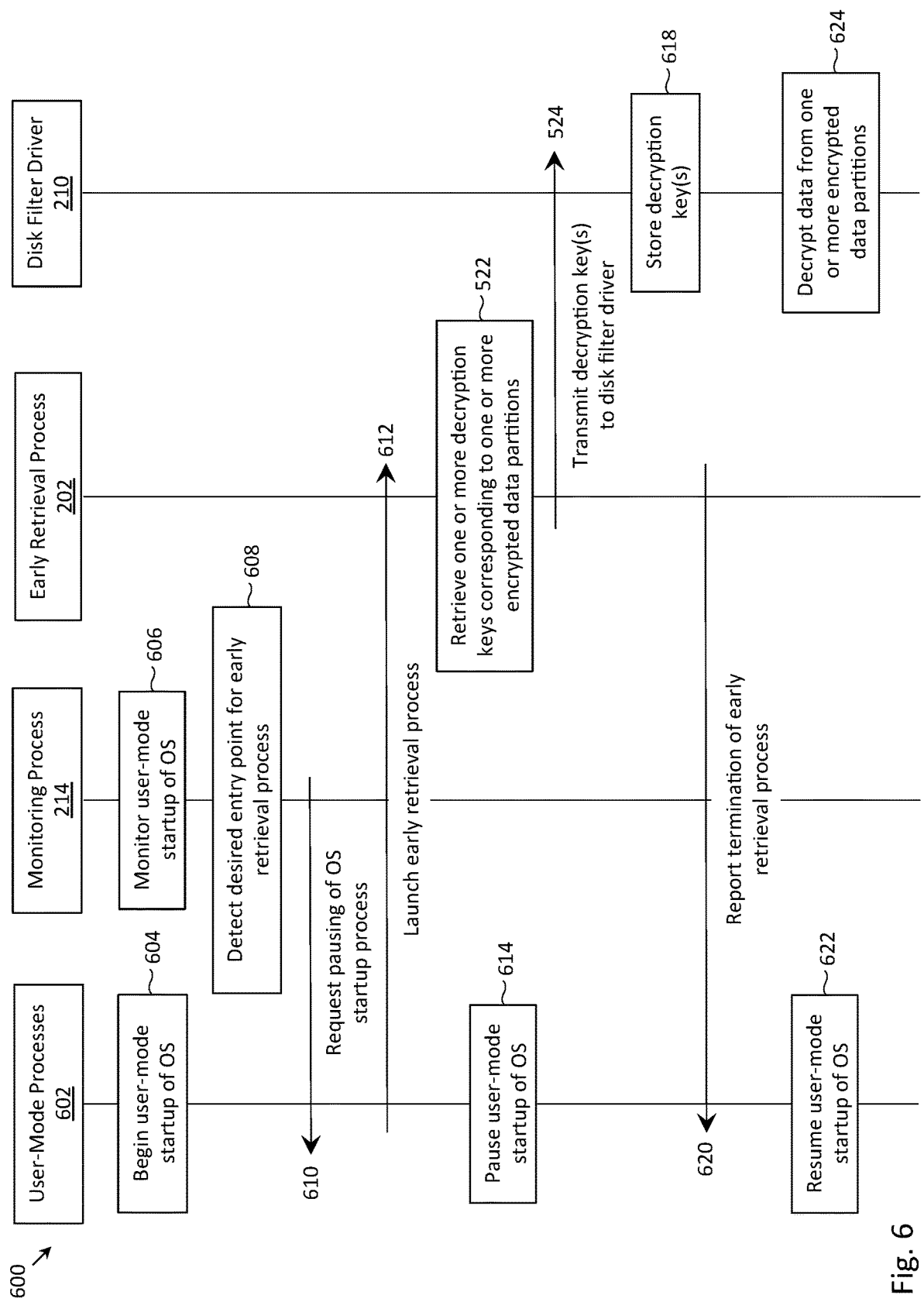
FIG. 6 depicts a sequence diagram of the user-mode startup of an operating system relying upon data from one or more encrypted data partitions, in accordance with one embodiment of the invention.

FIG. 6 depicts sequence 600 of the user-mode startup of an operating system relying upon data from one or more encrypted data partitions, in accordance with one embodiment of the invention. FIG. 6 is a more detailed explanation of the process illustrated in flowchart 530. At step 604, the user-mode startup of the operating system may commence. An example of such a startup was described above in FIG. 4. At step 606, monitoring process 214 may monitor the user-mode startup for a desired entry point of early retrieval process 202. As described above, possible entry points may include the beginning of the execution of the master smss.exe process, the beginning or conclusion of the execution of the smss.exe process, the beginning or conclusion of the execution of the csrss.exe process and the beginning or conclusion of the execution of the wininit.exe process.

At step 608, the desired entry point of early retrieval process 202 may be detected. In response to detecting the desired entry point, monitoring process 214 may request the operating system startup process to be paused (step 610). In one embodiment of the invention, step 610 may be performed by scheduling a user-mode asynchronous procedure call (APC). User-mode processes 602 (e.g., user-mode APC) may then launch early retrieval process 202 so as to attach one or more encrypted data partitions 218 to the operating system (step 612). During the execution of the early retrieval process, the startup of the operating system may be paused (step 614). Pausing the startup of the operating system may comprise delaying an execution of the service control manager process (services.exe), a local security authority subsystem server process (lsass.exe) and a windows logon process (winlogon.exe) until the one or more encrypted data partitions 218 have been attached to operating system 104.

At step 522, early retrieval process 202 may retrieve the one or more decryption keys corresponding to the one or more encrypted data partitions from key management server 122. Step 522 is described in more detail below in FIG. 7. At step 524, early retrieval process 202 may transmit the one or more decryption keys to disk filter driver 210. At step 618, disk filter driver 210 may store the one or more decryption keys (e.g., in main memory 112). At step 620, user-mode processes (e.g., user-mode APC) may be notified of the termination of early retrieval process 202, and may resume the user-mode startup of the operating system (step 622). At step 622, the user-mode startup of the operating system may resume with the one or more encrypted data partitions now accessible to the applications/services of the operating system. When data from the one or more encrypted data partitions is requested by the applications/services, data may be retrieved from the one or more encrypted data partitions, decrypted by disk filter driver using the one or more decryption keys (step 624), and returned to the applications/services.

Variations to the process depicted in FIG. 6 are possible. In an alternative embodiment, monitoring process 214 may be employed during steps 612 and 620. For example, during step 612, user-mode processes 602 may request monitoring process 214 to launch the early retrieval process, and upon receiving such request, monitoring process 214 may launch the early retrieval process. Further, during step 620, the termination of early retrieval process 202 may be reported to monitoring process 214 which then notifies user-mode processes 602 of same.

Figure 7:
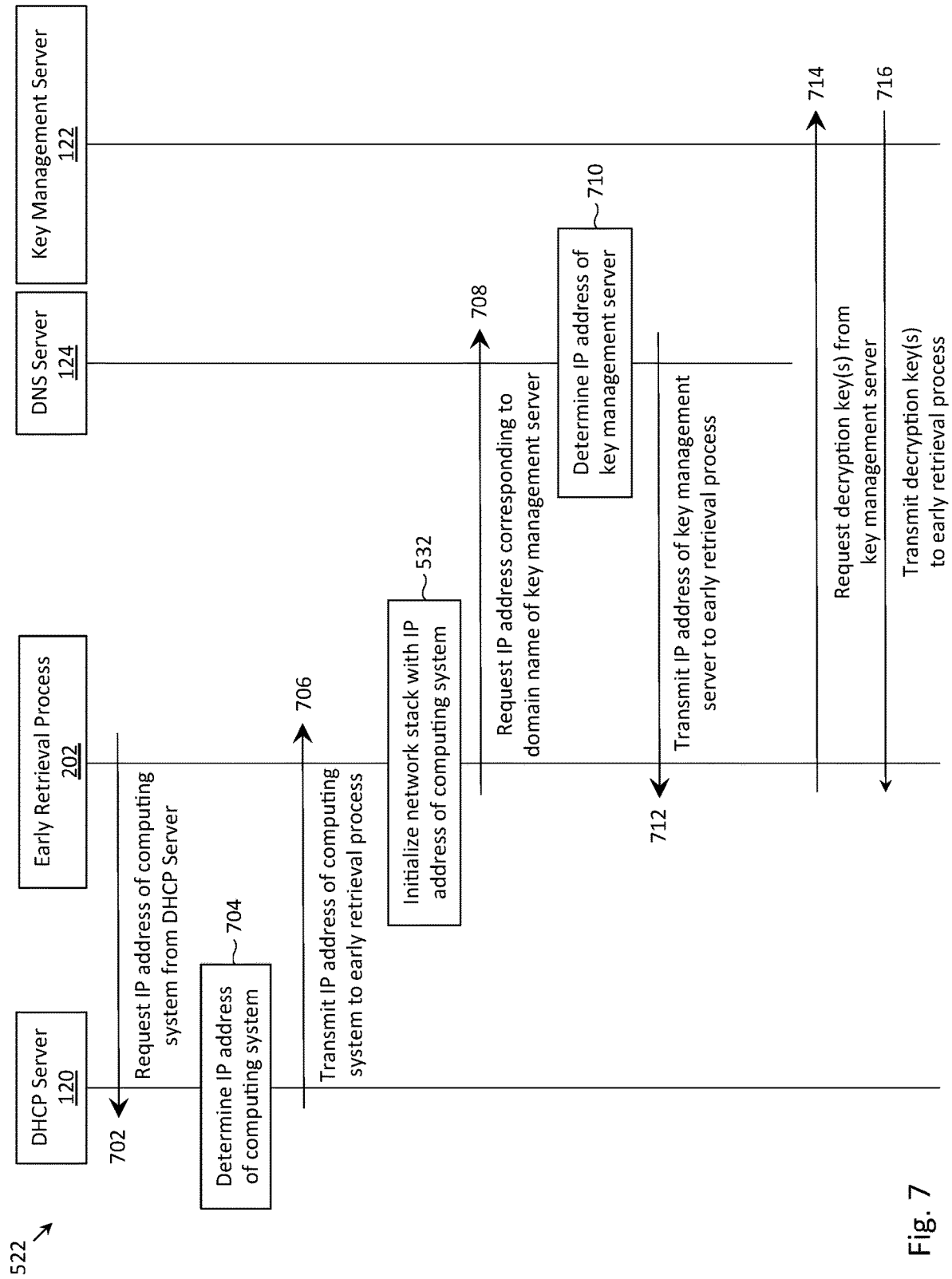
FIG. 7 depicts a sequence diagram of a process to retrieve one or more decryption keys from a key management server, in accordance with one embodiment of the invention.

FIG. 7 depicts step 522, which describes the retrieval of the one or more decryption keys, in more detail. At step 702, early retrieval process 202 may request the Internet protocol (IP) address of computing system 102 from DHCP server 120. At step 704, DHCP server 120 may determine the IP address of computing system 102 (e.g., may assign a dynamic IP address to computing system 102). At step 706, DHCP server 120 may transmit the determined IP address of computing system 102 to early retrieval process 202. In steps 702, 704 and 706, a DHCP client may be instantiated at computing system 102 in order to communicate with DHCP server 120. In some instances, computing system 102 may use a static IP address instead of a dynamic IP address (and hence steps 702, 704 and 706 may be omitted). In such case, early retrieval process 202 may determine the static IP address from operating system 104.

At step 532, early retrieval process 202 may initialize the transmission control protocol (TCP)/IP network stack with the IP address (whether dynamic or static) of computing system 102. At step 708, early retrieval process 202 may request an IP address corresponding to the domain name of key management server 122 from DNS server 124. At step 710, DNS server 124 may determine the IP address of key management server 122 that corresponds to the domain name of DNS server 124. At step 712, DNS server 124 may transmit the IP address of key management server 122 to early retrieval process 202. In the instance that the IP address of the key management server is already known to early retrieval process (e.g., is hard-coded in computing system 102), steps 708, 710 and 712 may be omitted. Having setup the network stack and having determined the IP address of the key management server 122, early retrieval process 202 may then communicate (e.g., via the Hypertext Transfer Protocol Secure (HTTPS) protocol) with key management server 122 to retrieve the one or more decryption keys from key management server (step 714). As previously mentioned, an authorization and authentication process may first be performed on a user of computing system 102 and/or computing system 102 before access to the one or more decryption keys is granted. Further, respective identifiers of the one or more encrypted data partitions 218 may also be transmitted during step 714, which permits key management server 122 to lookup the one or more decryption keys that correspond to the respective identifiers of the one or more encrypted data partitions. At step 716, key management server 122, upon authorizing and authenticating the user and/or computing system, and/or upon determining the decryption key(s) corresponding to the identifier(s) of the one or more encrypted data partitions, may return the determined one or more decryption keys to early retrieval process 202. Following step 716, early retrieval process 202 may release the IP address, and may delete the IP address from network interface 116 (if the IP address is obtained from DHCP server 120).

Below is a particular implementation of early retrieval process 202 for a Windows operating system:
Determine if operating system 104 is registered with key management server 122.
If operating system 104 is registered with key management server 122, early retrieval process 202 will proceed further. Otherwise, early retrieval process 202 will terminate, since the lack of registration of operating system 104 with key management server 122 will indicate that either the early retrieval process is not needed (e.g., data is only stored in unencrypted data partition 216), or operating system 104 is not authorized to execute the early retrieval process.
Determine a list of encrypted data partitions to be attached.
Retrieve a list of network interfaces available on computing system 102.
Select one of the network interfaces on the list.
Configure the selected network interface:
 Determine the IP configuration for the selected network interface. If static IP is configured for computing system 102, configure the network interface with the static IP and gateway. If a dynamic IP address is to be used, obtain the IP address from DHCP server 120 and configure the network interface with the IP address obtained from DHCP server 120.
Determine a list of key management servers that are available. While obtaining decryption key(s) from key management server 122, the key management servers in the list will be contacted one after another until the decryption key(s) have been retrieved successfully.
Attach the encrypted data partitions by (1) retrieving the decryption key(s) from the key management server 122, and (2) transmitting the decryption key(s) to disk filter driver 210.
Release the IP address of the network interface if the IP address is obtained from DHCP server.
Delete the IP and gateway entry from network interface 116 if they were obtained from DHCP server 120.

Following the early retrieval process 202 (which may include retrieving decryption key(s), and attaching encrypted data partition(s)) and resuming the startup process, a subsequent initialization of network services may be performed by operating system services (e.g., Windows DHCP Client). Windows DHCP Client may request dhcp options that are not requested by early retrieval process 202, and that Windows DHCP Client may also need to support obtaining vendor specific custom dhcp options from DHCP server 120.

FIGS. 8, 9A, 9B and 10 describe another application of early retrieval process 202. Access control driver 207 may be logically situated above file system driver 208 and may manage all access to files/folders of volumes 220, 222 attached to computing system 102 (e.g., a server) in accordance with an access control policy. While two volumes are depicted, it is understood that a greater or fewer number of volumes may be present in practice. As is known in the art, an operating system typically has a separate volume device in the storage device stack. A disk is typically partitioned, and for each partition, there is a corresponding volume device that is created (i.e., a basic disk). However, a volume device can aggregate multiple partitions of the same disk or different disks and present it as a single block of storage to the file system (i.e., a dynamic disk). The volume device essentially encapsulates block storages and provides location isolation of the disks, and the file system is mounted on top of a volume device. Therefore, a volume device encapsulation is created (1) to create a single block storage from multiple disks and (2) to also provide fault tolerance. In case a disk fails, a volume device can use a secondary disk. The file system, layered above the volume device, does not need to be concerned with the physical storage location of the data.

More specifically, access control driver 207 may intercept read/write requests to file/folders that are encrypted or will be encrypted. Similar to how disk filter driver 210 required access to keys for decrypting the encrypted disk partitions before any Application/Windows services started accessing the data from those encrypted disk partitions, access control driver 207 (also called a file system filter driver) may require access to keys for decrypting files/folders that are critical to user mode startup of the operating system before any Windows and application services start accessing data from those files/folders. For example, on Windows, there are a few application services (such as Active Directory) that start earlier than other services and access application data. If those files are encrypted, the application services will fail without access to those encrypted files. Accordingly, early retrieval process 202 may be used (similar to FIG. 2) to provide one or more decryption keys from key management server 122 to access control driver 207 in FIG. 8.

Figure 8:
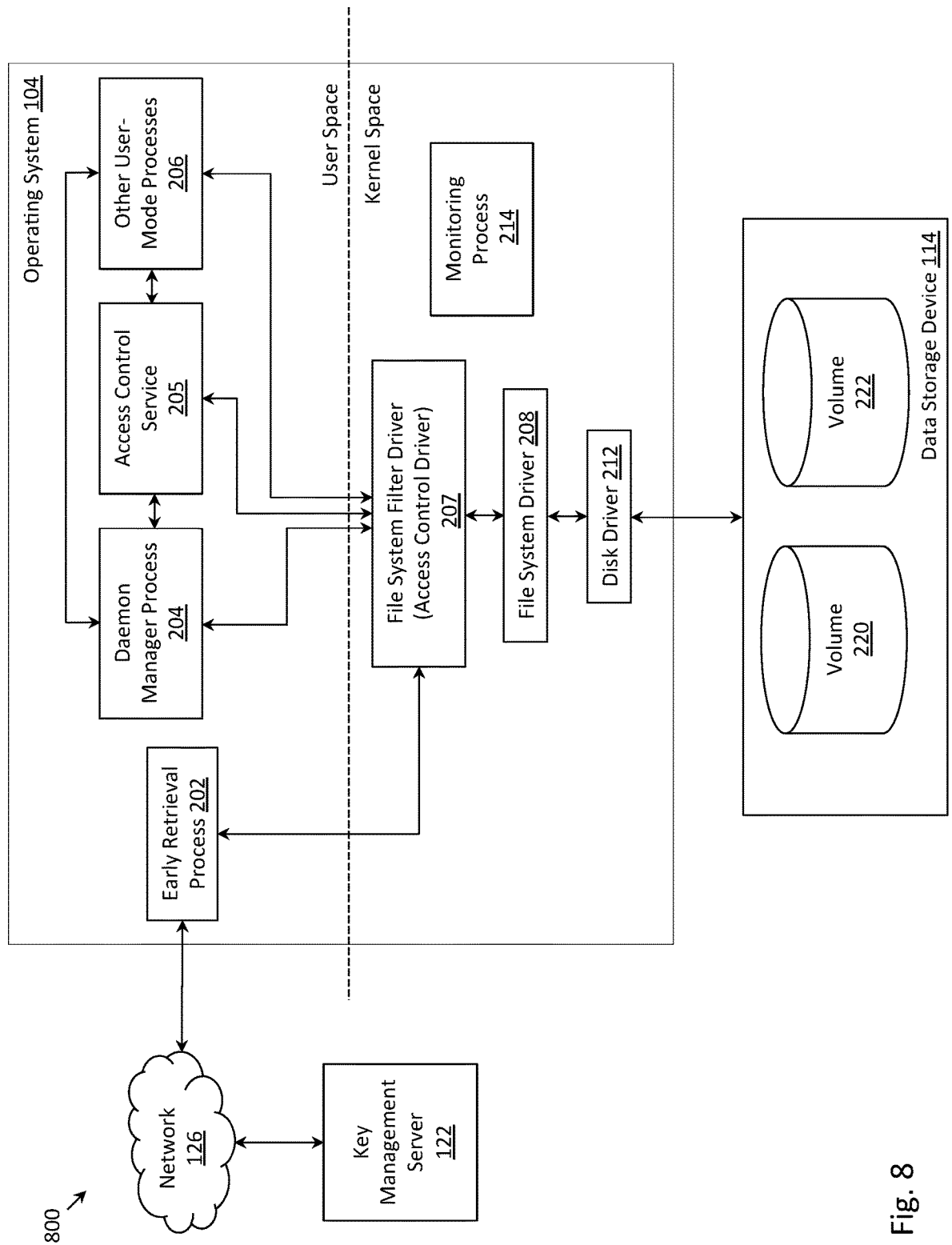
FIG. 8 depicts a computing system in which an early retrieval process is configured to retrieve one or more decryption keys and/or an access control policy from a key management server and provide such information to an access control driver, in accordance with one embodiment of the invention.

In the context of FIG. 8, early retrieval process 202 may also be used to provide the access control policy to access control driver 207. The access control policy must be available during the user mode startup of the operating system before any Windows and application services start running. For example, a Windows service can be configured to run under a specific service account and there might be an access control policy for that service account (hence, requiring the access control policy to be available before the Windows service can be executed). In one embodiment of the invention, access control driver 207 may also provide an interface to add or remove an access control policy for volumes attached to computing system 102. Further details of the access control policy are now provided.

A system administrator, by default, has access to all the files/folders from data volumes attached to computing system 102. The data stored on computing system 102 could be application data (e.g., database data) or user data (e.g., employee data). The default configuration, however, may lead to data leakage and may compromise sensitive information stored on computing system 102. To address these security vulnerabilities, an access control policy that is retrieved by early retrieval process may permit only authorized user, groups and/or applications to access and modify the data on computing system 102. For instance, an access control policy may specify that user data (e.g., a user profile) stored on a file server should only be accessible by the corresponding user. Further, an access control policy may specify that department data stored on a file server should only be accessed by the employees of the department. Further, an access control policy may specify that application data (such as SQL/Exchange database files) should only be accessed by specific application services and executables. Further, an access control policy may specify that critical system files and settings (e.g., password file, host lookup data) should only be accessed and modified by authorized individuals and/or processes.

Additionally, the data on computing system 102 can be encrypted at a granular level (e.g., file level) to further protect the data in case access control driver 207 is disabled or crippled. Without access control driver 207, any encrypted files will not be able to be decrypted. Therefore, an unauthorized user will not be able to bypass access control driver 207 and gain access to the protected data.

In one embodiment of the invention, the access control policy specifies what files/folders are (or are to be) protected and who (e.g., users/groups/applications) can or cannot access and modify the data. More specifically, a file or folder may be specified by its location (e.g., e:\sqldata), and if a folder is specified in an access control policy, the policy may apply to all of the files and subfolders within the folder. Users/groups may include a local User/Group account, which may be specified by a ComputerName\UserName pathname or a ComputerName\GroupName pathname. Users/Groups may also include an Active Directory User/Group Account which may be specified by a Domain\UserName pathname or a Domain\GroupName pathname. Applications may be allowed or denied access irrespective of the user context under which they are accessing the files/folders. Applications may be specified by a name of an executable file, may be optionally specified by a location of an executable file, may be optionally specified by a signature/checksum of an executable file, may be optionally specified by a Windows service (e.g., Service Name, Service Account—Context under which the Windows service runs), may be optionally specified by a digital signature (e.g., subject name of a certificate, in which the application is digitally signed using a code signing certificate). Access permission may have several levels. For example, a user may be granted full access (i.e., read and write) to a file/folder or may be granted only read access.

One component in FIG. 8 not discussed in FIG. 2 is access control service 205. Access control service is a Windows service which executes after the execution of the early retrieval process and checks for access control policy changes, retrieves an updated access control policy from key management server 122, and provides the updated access control policy to access control driver 207. Access control service 205 may additionally retrieve encryption/decryption keys for files/folders as they are accessed, after the access control service starts running and operating system network services are available. Access control service 205 may also receive notifications from access control driver 207 and log access control enforcements.

Figure 9A:
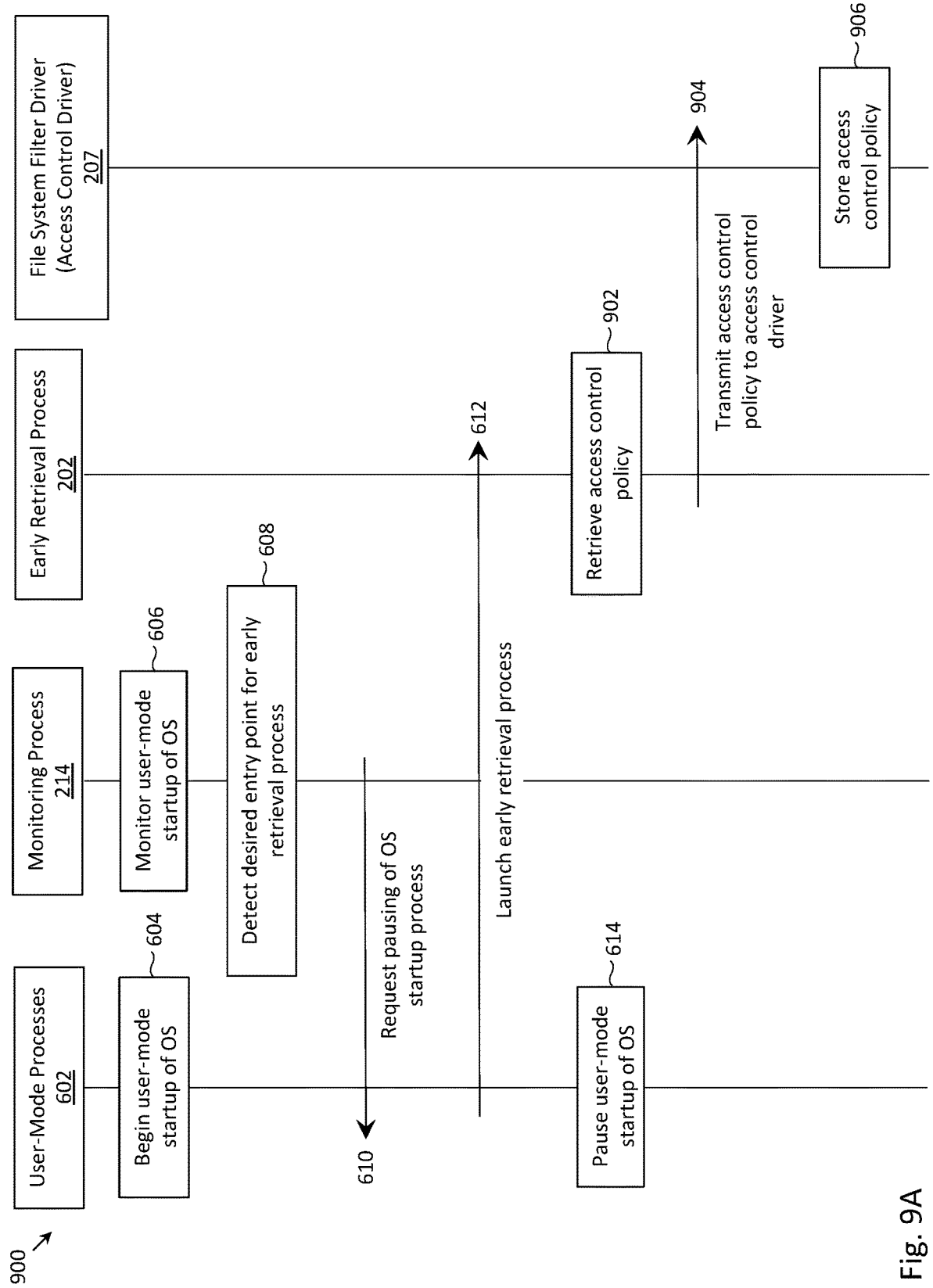
FIGS. 9A-9B depict a sequence diagram of the user-mode startup of an operating system relying upon data from one or more encrypted files/folders and/or an access control policy, in accordance with one embodiment of the invention.
Figure 9B:
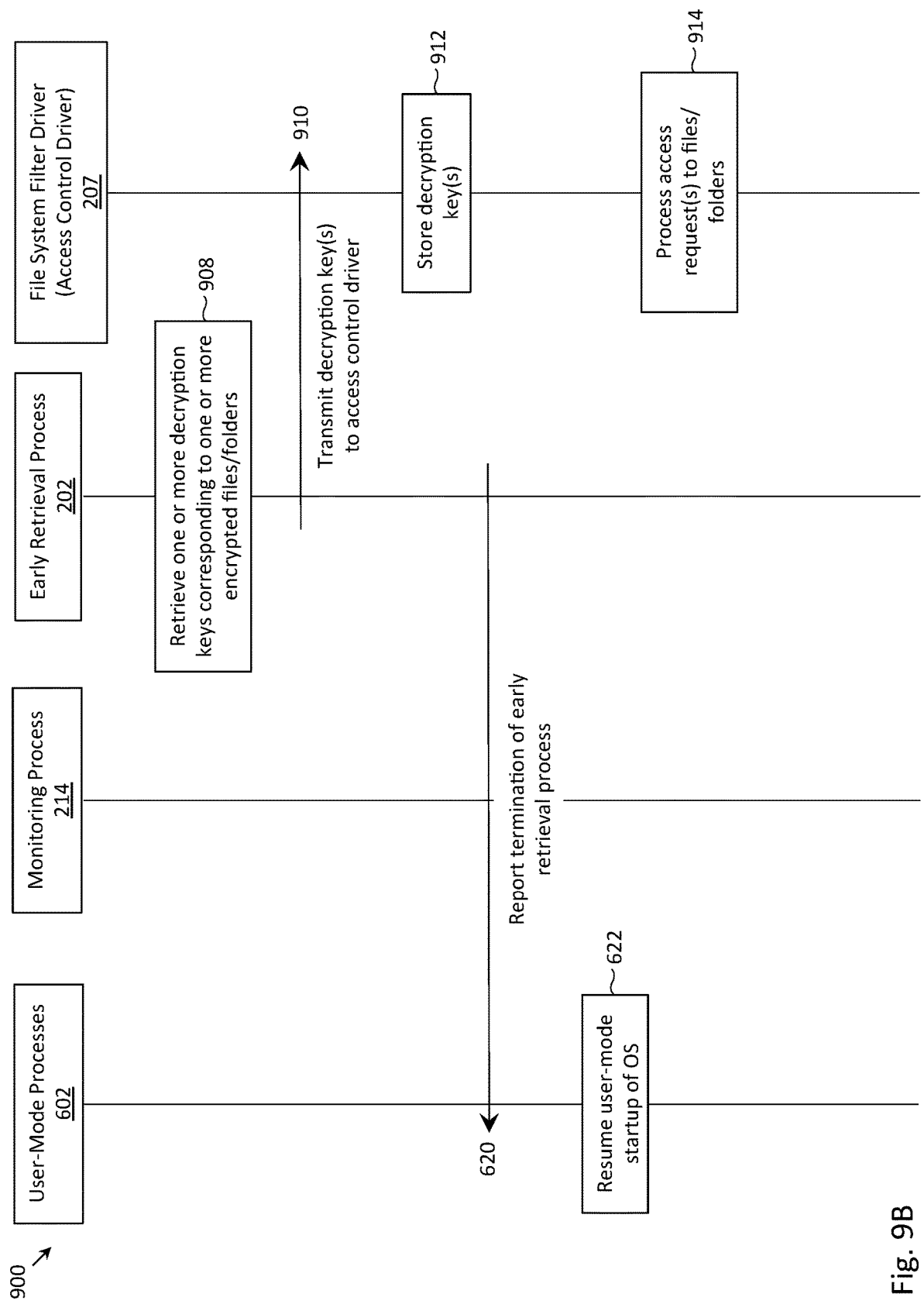

FIGS. 9A-9B depict a sequence diagram including steps in which early retrieval process 202 provides decryption keys and/or an access control policy to access control driver 207. The early retrieval process may be launched 612 at the entry points previously described in the context of FIG. 6. A description of these entry points will not be repeated. At step 902, early retrieval process may retrieve an access control policy from key management server 122 in a similar manner as how the decryption keys were retrieved in FIG. 7. At step 904, early retrieval process may transmit the access control policy to access control driver 207. At step 906, access control driver 207 may store the access control policy. At step 908, early retrieval process 202 may retrieve one or more decryption keys corresponding to one or more encrypted files/folders from key management server 122 in a similar manner as how the decryption keys were retrieved in FIG. 7. In the event that both the access control policy is retrieved (step 902) and decryption keys corresponding to one or more encrypted files/folders are retrieved (step 908), steps 702, 704, 706, 532, 708, 710 and 712 from FIG. 7 only need to be performed once. At step 910, early retrieval process 202 may transmit these decryption key(s) to access control driver 207. At step 912, access control driver 207 may store the one or more decryption keys. At step 914, after the user-mode startup of the operating system has resumed, access control driver 207 may process one or more access requests to files/folders 914, and such processing is described in FIG. 10.

Figure 10:
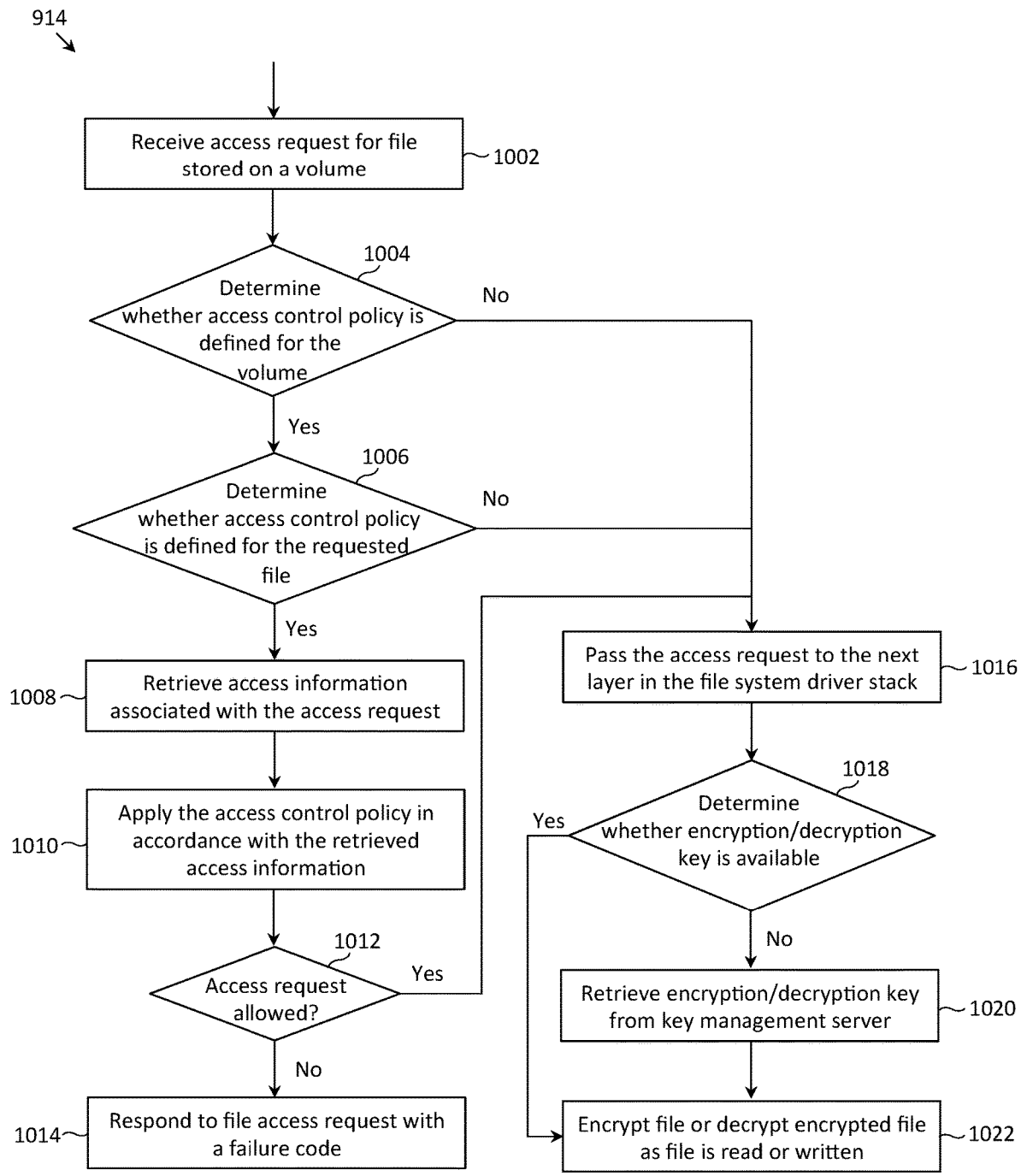
FIG. 10 depicts a sequence diagram of the processing, by an access control driver, of one or more access requests to files/folder, in accordance with one embodiment of the invention.

At step 1002 of FIG. 10, access control driver 207 may receive an access request for a file (or folder) stored on a volume. At step 1004, access control driver 207 may determine whether an access control policy is defined for the volume. If not, the request is passed to the next layer in the file system driver stack (step 1016), which could be another file system filter driver (not depicted in FIG. 8) or file system driver 208. For completeness, it is noted that the file system driver stack of FIG. 8 includes access control driver 207 and file system driver 208. In general, a file system driver stack may include a file system driver and zero or more file system filter drivers. Otherwise, if the access control policy is defined for the volume, the process proceeds to step 1006, in which access control driver 207 determines whether the access control policy is defined for the requested file (or folder). If not, the request is passed to the next layer in the file system driver stack (step 1016). Otherwise, if the access control policy is defined for the requested file (or folder), access control driver 207 retrieves access information associated with the access request. The access information may include an access context for the request. The access context may include one or more access tokens which represent the security context of a process or thread. The information in a token may include the identity, privileges and group membership of the user account on whose behalf the file (or folder) is being accessed. The access information may also include information associated with an application that requests access to the file (or folder). The application information may include the name and/or full path of the executable, name of the service if it is running as a service, etc.

At step 1010, access control driver 207 may apply the access control policy in accordance with the retrieved access information. If the policy contains any restrictions on the application that requests access to the file (or folder), access control driver 207 may compute the signature/checksum of the application executable file, or validate a digital signature of the application executable file to verify the identity of the application.

If the access request is not permitted by the access control policy ("No" branch of step 1012) (i.e., the access control policy does not allow the application or user to access the file or the folder), the access control driver 207 may respond to the file access request with a failure code (step 1014).

If the access request is permitted by the access control policy ("Yes" branch of step 1012), the access request may be passed to the next layer in the file system driver stack (step 1016). When file system driver 208 (while FIG. 8 depicts only access control driver 207 layered on top of the file system driver 208, there could be other file system filter drivers layered above or below access control driver 207) completes the access request successfully, the file will be created or opened. The result of the operation (file creation or open) is propagated back through the file system driver stack all the way up to access control driver 207.

After a successful creation or opening of the file, if the file data is encrypted or to be encrypted according to the access control policy, access control driver 207 may determine whether encryption/decryption keys are available for the requested file (step 1018). Without the encryption/decryption key, the file data is still accessible but it would be cipher (encrypted) data. What type of access is to be provided, whether cipher (encrypted) or clear (decrypted) data, may be determined based on the access control policy. The encryption/decryption keys might be available if they had already been provided by the early retrieval process for critical files. The encryption/decryption keys might also be available if the file (or folder) was previously accessed and the keys were already retrieved by access control service 205. It is noted that access control driver 207 caches the encryption/decryption keys or the key schedule which is used for encrypting/decrypting the data. A key schedule is an algorithm that expands a relatively short master key (typically between 40 and 256 bits long) to a relatively large expanded key (typically several hundred or thousand bits) for later use in an encryption and decryption algorithm.

If the encryption/decryption key is not available, access control driver 207 may request access control service 205 to retrieve the encryption/decryption key from key management server 122 corresponding to the encrypted or to be encrypted file or folder (step 1020). Subsequently, read and write requests to the file are processed by decrypting the file data or encrypting the file data as the file is read or written (step 1022).

While the storage device stack of FIG. 2 included disk filter driver 210 and the storage device stack of FIG. 8 included access control driver 207, it is understood that a storage device stack could include both disk filter driver 210 and access control driver 207 in the instance that access to encrypted files/folders and encrypted data partitions is needed.

Figure 11:
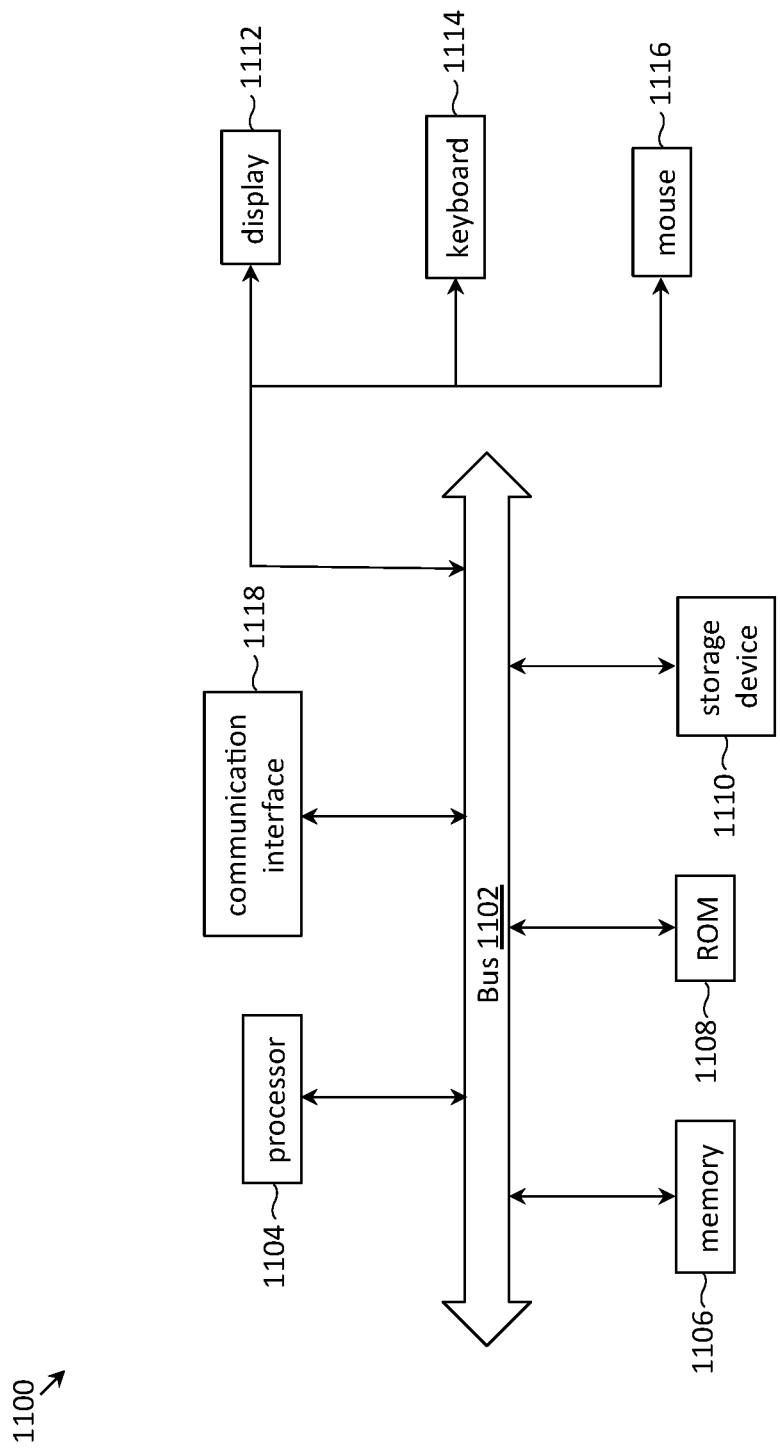
FIG. 11 depicts components of a computer system in which computer readable instructions instantiating the methods of the present invention may be stored and executed.

FIG. 11 depicts components of a computer system in which computer readable instructions instantiating the methods of the present invention may be stored and executed. As is apparent from the foregoing discussion, aspects of the present invention involve the use of various computer systems and computer readable storage media having computer-readable instructions stored thereon. FIG. 11 provides an example of a system 1100 that may be representative of any of the computing systems (e.g., computing system 102, DHCP server 120, key management server 122, DNS server 124, etc.) discussed herein. Note, not all of the various computer systems have all of the features of system 1100. For example, certain ones of the computer systems discussed above may not include a display inasmuch as the display function may be provided by a client computer communicatively coupled to the computer system or a display function may be unnecessary. Such details are not critical to the present invention.

System 1100 includes a bus 1102 or other communication mechanism for communicating information, and a processor 1104 coupled with the bus 1102 for processing information. Computer system 1100 also includes a main memory 1106, such as a random access memory (RAM) or other dynamic storage device, coupled to the bus 1102 for storing information and instructions to be executed by processor 1104. Main memory 1106 also may be used for storing temporary variables or other intermediate information during execution of instructions to be executed by processor 1104. Computer system 1100 further includes a read only memory (ROM) 1108 or other static storage device coupled to the bus 1102 for storing static information and instructions for the processor 1104. A storage device 1110, for example a hard disk, flash memory-based storage medium, or other storage medium from which processor 804 can read, is provided and coupled to the bus 1102 for storing information and instructions (e.g., operating systems, applications programs and the like).

Computer system 1100 may be coupled via the bus 1102 to a display 1112, such as a flat panel display, for displaying information to a computer user. An input device 1114, such as a keyboard including alphanumeric and other keys, may be coupled to the bus 1102 for communicating information and command selections to the processor 1104. Another type of user input device is cursor control device 1116, such as a mouse, a trackpad, or similar input device for communicating direction information and command selections to processor 1104 and for controlling cursor movement on the display 1112. Other user interface devices, such as microphones, speakers, etc. are not shown in detail but may be involved with the receipt of user input and/or presentation of output.

The processes referred to herein may be implemented by processor 1104 executing appropriate sequences of computer-readable instructions contained in main memory 1106. Such instructions may be read into main memory 1106 from another computer-readable medium, such as storage device 1110, and execution of the sequences of instructions contained in the main memory 1106 causes the processor 1104 to perform the associated actions. In alternative embodiments, hard-wired circuitry or firmware-controlled processing units may be used in place of or in combination with processor 1104 and its associated computer software instructions to implement the invention. The computer-readable instructions may be rendered in any computer language.

In general, all of the above process descriptions are meant to encompass any series of logical steps performed in a sequence to accomplish a given purpose, which is the hallmark of any computer-executable application. Unless specifically stated otherwise, it should be appreciated that throughout the description of the present invention, use of terms such as "processing", "computing", "calculating", "determining", "displaying", "receiving", "transmitting" or the like, refer to the action and processes of an appropriately programmed computer system, such as computer system 1100 or similar electronic computing device, that manipulates and transforms data represented as physical (electronic) quantities within its registers and memories into other data similarly represented as physical quantities within its memories or registers or other such information storage, transmission or display devices.

Computer system 1100 also includes a communication interface 1118 coupled to the bus 1102. Communication interface 1118 may provide a two-way data communication channel with a computer network, which provides connectivity to and among the various computer systems discussed above. For example, communication interface 1118 may be a local area network (LAN) card to provide a data communication connection to a compatible LAN, which itself is communicatively coupled to the Internet through one or more Internet service provider networks. The precise details of such communication paths are not critical to the present invention. What is important is that computer system 1100 can send and receive messages and data through the communication interface 1118 and in that way communicate with hosts accessible via the Internet. It is noted that the components of system 1100 may be located in a single device or located in a plurality of physically and/or geographically distributed devices.

Thus, methods and systems for performing an early retrieval process during the user-mode startup of an operating system have been described. It is to be understood that the above-description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A method for a computing system, the computing system comprising a processor, a memory and a data storage device, the method comprising:

loading, by a boot loader, an operating system of the computing system from a boot partition into the memory;

during a user-mode startup of the operating system of the computing system that occurs after the loading of the operating system from the boot partition into the memory, the user-mode startup performed by an execution of one or more user-mode processes, and prior to an execution of a service control manager process, pausing the user-mode startup of the operating system, and executing an early retrieval process, the execution of the early retrieval process including: (i) retrieving, with network services other than that initialized by the service control manager process and from a network-attached key management server, one or more of a decryption key corresponding to an encrypted file, a decryption key corresponding to an encrypted folder, a decryption key corresponding to an encrypted data partition, or an access control policy, and (ii) if the decryption key corresponding to the encrypted file is retrieved, transmitting the decryption key corresponding to the encrypted file to an access control driver of the operating system, if the decryption key corresponding to the encrypted folder is retrieved, transmitting the decryption key corresponding to the encrypted folder to the access control driver, if the decryption key corresponding to the encrypted data partition is retrieved, transmitting the decryption key corresponding to the encrypted data partition to a disk filter driver of the operating system, and if the access control policy is retrieved, transmitting the access control policy to the access control driver, wherein the execution of the early retrieval process begins at any time during or after an execution of a master session manager process and prior to the execution of the service control manager process; and resuming the user-mode startup of the operating system with at least one of the encrypted file, the encrypted folder, the encrypted data partition or the access control policy accessible to the operating system.

2. The method of claim 1, wherein the execution of the early retrieval process starts immediately after a beginning of an execution of a master session manager process.

3. The method of claim 1, wherein the execution of the early retrieval process starts immediately after a beginning of an execution of a session manager process.

4. The method of claim 1, wherein the execution of the early retrieval process starts immediately after a beginning of an execution of a client/server runtime subsystem process.

5. The method of claim 1, wherein the execution of the early retrieval process starts immediately after an execution of a windows initialization process.

6. The method of claim 1, wherein the retrieval of one or more of the decryption key corresponding to the encrypted file, the decryption key corresponding to the encrypted folder, the decryption key corresponding to the encrypted data partition, or the access control policy from the network-attached key management server comprises:

determining an Internet Protocol (IP) address of a network interface of the computing system, wherein the IP address is either a static IP address that is retrieved from the operating system or is a dynamic IP address that is retrieved from a dynamic host configuration protocol (DHCP) server;

initializing a transmission control protocol (TCP)/IP network stack with the IP address of the network interface;

determining an IP address of the network-attached key management server, wherein the IP address of the network-attached key management server is either retrieved from a domain name system (DNS) server or is retrieved locally from the computing system; and retrieving, using the initialized TCP/IP network stack, the one or more of the decryption key corresponding to the encrypted file, the decryption key corresponding to the encrypted folder, the decryption key corresponding to the encrypted data partition or the access control policy from the network-attached key management server using the IP address of the network-attached key management server.

7. A computing system comprising a processor, a memory and a data storage device, the data storage device comprising instructions that, when executed by the processor, cause the processor to:

load an operating system of the computing system from a boot partition into the memory;

during a user-mode startup of the operating system of the computing system that occurs after the loading of the operating system from the boot partition into the memory, the user-mode startup performed by an execution of one or more user-mode processes, and prior to an execution of a service control manager process, pause the user-mode startup of the operating system, and execute an early retrieval process, the execution of the early retrieval process including: (i) retrieving, with network services other than that initialized by the service control manager process and from a network-attached key management server, one or more of a decryption key corresponding to an encrypted file, a decryption key corresponding to an encrypted folder, a decryption key corresponding to an encrypted data partition, or an access control policy, and (ii) if the decryption key corresponding to the encrypted file is retrieved, transmitting the decryption key corresponding to the encrypted file to an access control driver of the operating system, if the decryption key corresponding to the encrypted folder is retrieved, transmitting the decryption key corresponding to the encrypted folder to the access control driver, if the decryption key corresponding to the encrypted data partition is retrieved, transmitting the decryption key corresponding to the encrypted data partition to a disk filter driver of the operating system, and if the access control policy is retrieved, transmitting the access control policy to the access control driver, wherein the execution of the early retrieval process begins at any time during or after an execution of a master session manager process and prior to the execution of the service control manager process; and resuming the user-mode startup of the operating system with at least one of the encrypted file, the encrypted folder, the encrypted data partition or the access control policy accessible to the operating system.

8. The computing system of claim 7, wherein the execution of the early retrieval process starts immediately after a beginning of an execution of a master session manager process.

9. The computing system of claim 7, wherein the execution of the early retrieval process starts immediately after a beginning of an execution of a session manager process.

10. The computing system of claim 7, wherein the execution of the early retrieval process starts immediately after a beginning of an execution of a client/server runtime subsystem process.

11. The computing system of claim 7, wherein the execution of the early retrieval process starts immediately after an execution of a windows initialization process.

12. The computing system of claim 7, wherein the retrieval of one or more of the decryption key corresponding to the encrypted file, the decryption key corresponding to the encrypted folder, the decryption key corresponding to the encrypted data partition, or the access control policy from the network-attached key management server comprises:

determining an Internet Protocol (IP) address of a network interface of the computing system, wherein the IP address is either a static IP address that is retrieved from the operating system or is a dynamic IP address that is retrieved from a dynamic host configuration protocol (DHCP) server;

initializing a transmission control protocol (TCP)/IP network stack with the IP address of the network interface;

determining an IP address of the network-attached key management server, wherein the IP address of the network-attached key management server is either retrieved from a domain name system (DNS) server or is retrieved locally from the computing system; and retrieving, using the initialized TCP/IP network stack, the one or more of the decryption key corresponding to the encrypted file, the decryption key corresponding to the encrypted folder, the decryption key corresponding to the encrypted data partition or the access control policy from the network-attached key management server using the IP address of the network-attached key management server.

13. The computing system of claim 7, wherein a file system driver of the operating system communicates with the one or more user-mode processes through the access control driver of the operating system, and the file system driver of the operating system communicates with a disk driver of the operating system through the disk filter driver of the operating system.

14. A method for retrieving one or more decryption keys during a startup process of an operating system of a computing system, the computing system comprising a processor, a memory and a data storage device, the method comprising:

monitoring a portion of the startup process of the operating system, the portion of the startup process performed by an execution of one or more user-mode processes, wherein the monitored portion of the startup process includes one or more of a master session manager (manager smss.exe) process, an autochk.exe process, a session manager (smss.exe) process, a client/server runtime subsystem (csrss.exe) process, or a Windows initialization (wininit.exe) process;

after monitoring the portion of the startup process performed by the execution of the one or more user-mode processes, retrieving the one or more decryption keys by:

determining an Internet Protocol (IP) address of a network interface of the computing system, wherein the IP address is either a static IP address that is retrieved from the operating system or is a dynamic IP address that is retrieved from a dynamic host configuration protocol (DHCP) server;

initializing a transmission control protocol (TCP)/IP network stack with the IP address of the network interface;

determining an IP address of a key management server, wherein the IP address of the key management server is either retrieved from a domain name system (DNS) server or is retrieved locally from the computing system; and retrieving, using the initialized TCP/IP network stack, the one or more decryption keys from the key management server using the IP address of the key management server;

after retrieving the one or more decryption keys, performing an initialization of network services, wherein the initialization of network services is performed by an operating system service; and in response to data from at least one of an encrypted data partition, data folder or data file of the data storage device being requested by a user-mode process of the operating system, decrypting, using the one or more decryption keys, the data from at least one of the encrypted data partition, data folder or data file.

15. A method for retrieving one or more decryption keys during a startup process of an operating system of a computing system, the computing system comprising a processor, a memory and a data storage device, the method comprising:

(i) during a user-mode startup of the operating system, the user-mode startup occurring after the operating system has been loaded into the memory from a boot partition, and (ii) prior to an execution of a service control manager process, retrieving the one or more decryption keys by:

determining an Internet Protocol (IP) address of a network interface of the computing system, wherein the IP address is either a static IP address that is retrieved from the operating system or is a dynamic IP address that is retrieved from a dynamic host configuration protocol (DHCP) server;

initializing a transmission control protocol (TCP)/IP network stack with the IP address of the network interface;

determining an IP address of a key management server, wherein the IP address of the key management server is either retrieved from a domain name system (DNS) server or is retrieved locally from the computing system;

transmitting respective identifiers of one or more encrypted data partitions of the data storage device to the key management server; and retrieving, using the initialized TCP/IP network stack, the one or more decryption keys from the key management server using the IP address of the key management server, wherein the one or more decryption keys that are retrieved correspond to the identifiers of the one or more encrypted data partitions;

after retrieving the one or more decryption keys, performing an initialization of network services, wherein the initialization of network services is performed by an operating system service; and in response to data from at least one of an encrypted data partition, data folder or data file of the data storage device being requested by a user-mode process of the operating system, decrypting, using the one or more decryption keys, the data from at least one of the encrypted data partition, data folder or data file.

16. The method of claim 15, further comprising transmitting the one or more retrieved decryption keys to a disk filter driver of the operating system, the disk filter driver providing the operating system with access to the one or more encrypted data partitions.

17. A method for retrieving one or more decryption keys during a startup process of an operating system of a computing system, the computing system comprising a processor, a memory and a data storage device, the method comprising:

(i) during a user-mode startup of the operating system, the user-mode startup occurring after the operating system has been loaded into the memory from a boot partition, and (ii) prior to an execution of a service control manager process, retrieving the one or more decryption keys by:

determining an Internet Protocol (IP) address of a network interface of the computing system, wherein the IP address is either a static IP address that is retrieved from the operating system or is a dynamic IP address that is retrieved from a dynamic host configuration protocol (DHCP) server;

initializing a transmission control protocol (TCP)/IP network stack with the IP address of the network interface;

determining an IP address of a key management server, wherein the IP address of the key management server is either retrieved from a domain name system (DNS) server or is retrieved locally from the computing system; and retrieving, using the initialized TCP/IP network stack, the one or more decryption keys from the key management server using the IP address of the key management server;

after retrieving the one or more decryption keys, (i) releasing the IP address of the network interface, wherein the IP address is a dynamic IP address, and (ii) performing an initialization of network services, wherein the initialization of network services is performed by an operating system service; and in response to data from at least one of an encrypted data partition, data folder or data file of the data storage device being requested by a user-mode process of the operating system, decrypting, using the one or more decryption keys, the data from at least one of the encrypted data partition, data folder or data file.

18. The method of claim 17, wherein the operating system service is a Windows dynamic host configuration protocol (DHCP) client.

* * * * *

UNITED STATES PATENT AND TRADEMARK OFFICE
CERTIFICATE OF CORRECTION

PATENT NO. : 11,068,280 B2
APPLICATION NO. : 16/481726
DATED : July 20, 2021
INVENTOR(S) : Babu Katchapalayam and Stephen D. Pate Page 1 of 1

It is certified that error appears in the above-identified patent and that said Letters Patent is hereby corrected as shown below:

On the Title Page

For item (63) on pages 1 and 2, replace:
"Continuation of application No. PCT/US2017/052777, filed on Sep. 21, 2017, which is a continuation-in-part of application No. 15/711,535, filed on Sep. 21, 2017, now Pat. No. 10,402,206, and a continuation-in-part of application No. 15/421,291, filed on Jan. 31, 2017, now Pat. No. 9,817,675, said application No. 15/711,535 is a continuation-in-part of application No. 15/421,291, filed on Jan. 31, 2017, now Pat. No. 9,817,675."

With:
"371 national stage of international application No. PCT/US2017/052777, filed on Sep. 21, 2017, which is a continuation-in-part of application No. 15/711,535, filed on Sep. 21, 2017, now Pat. No. 10,402,206, and a continuation-in-part of application No. 15/421,291, filed on Jan. 31, 2017, now Pat. No. 9,817,675, said application No. 15/711,535 is a continuation of application No. 15/421,291, filed on Jan. 31, 2017, now Pat. No. 9,817,675."

Signed and Sealed this
Twenty-fourth Day of August, 2021

Drew Hirshfeld
*Performing the Functions and Duties of the
Under Secretary of Commerce for Intellectual Property and
Director of the United States Patent and Trademark Office*